(12) United States Patent
Sanders et al.

(10) Patent No.: US 9,779,538 B2
(45) Date of Patent: Oct. 3, 2017

(54) REAL-TIME CONTENT IMMERSION SYSTEM

(71) Applicant: Lucasfilm Entertainment Co. Ltd., San Francisco, CA (US)

(72) Inventors: Mike Sanders, San Francisco, CA (US); Kim Libreri, Fairfax, CA (US); Nicholas Grant Rasmussen, San Francisco, CA (US); John Gaeta, Ross, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 14/571,017

(22) Filed: Dec. 15, 2014

(65) Prior Publication Data

US 2015/0350628 A1   Dec. 3, 2015

Related U.S. Application Data

(60) Provisional application No. 62/004,121, filed on May 28, 2014, provisional application No. 62/005,731, filed on May 30, 2014.

(51) Int. Cl.
*G06T 15/00* (2011.01)
*G06T 15/08* (2011.01)
*H04N 5/222* (2006.01)

(52) U.S. Cl.
CPC .......... *G06T 15/08* (2013.01); *H04N 5/2224* (2013.01); *G06T 2215/12* (2013.01); *G06T 2215/16* (2013.01)

(58) Field of Classification Search
CPC . G06T 15/08; G06T 2215/16; G06T 2215/12; H04N 5/2224
USPC .......................................... 345/418, 419, 428
See application file for complete search history.

(56) References Cited

U.S. PATENT DOCUMENTS

| | | | | |
|---|---|---|---|---|
| 8,298,079 B2 * | 10/2012 | Mori | ........................ | A63F 13/12 463/29 |
| 8,411,092 B2 * | 4/2013 | Sheblak | ................... | A63F 13/10 345/428 |
| 8,427,471 B2 * | 4/2013 | Tsukizaki | ................ | A63F 13/10 345/418 |
| 8,491,394 B2 * | 7/2013 | Fields | ..................... | A63F 13/10 463/42 |
| 9,087,401 B1 * | 7/2015 | Zheng | ................... | G06T 15/205 |
| 9,244,924 B2 * | 1/2016 | Cheng | ............... | G06F 17/30023 |
| 9,305,403 B2 * | 4/2016 | Cabrita | ................... | G06T 19/20 |

* cited by examiner

*Primary Examiner* — Phu K Nguyen
(74) *Attorney, Agent, or Firm* — Kilpatrick Townsend & Stockton LLP

(57) ABSTRACT

A method may include presenting a scene from linear content on one or more display devices in an immersive environment, and receiving, from a user within the immersive environment, input to change an aspect of the scene. The method may also include accessing 3-D virtual scene information previously used to render the scene, and changing the 3-D virtual scene information according to the changed aspect of the scene. The method may additionally include rending the 3-D virtual scene to incorporate the changed aspect, and presenting the rendered scene in real time in the immersive user environment.

20 Claims, 19 Drawing Sheets

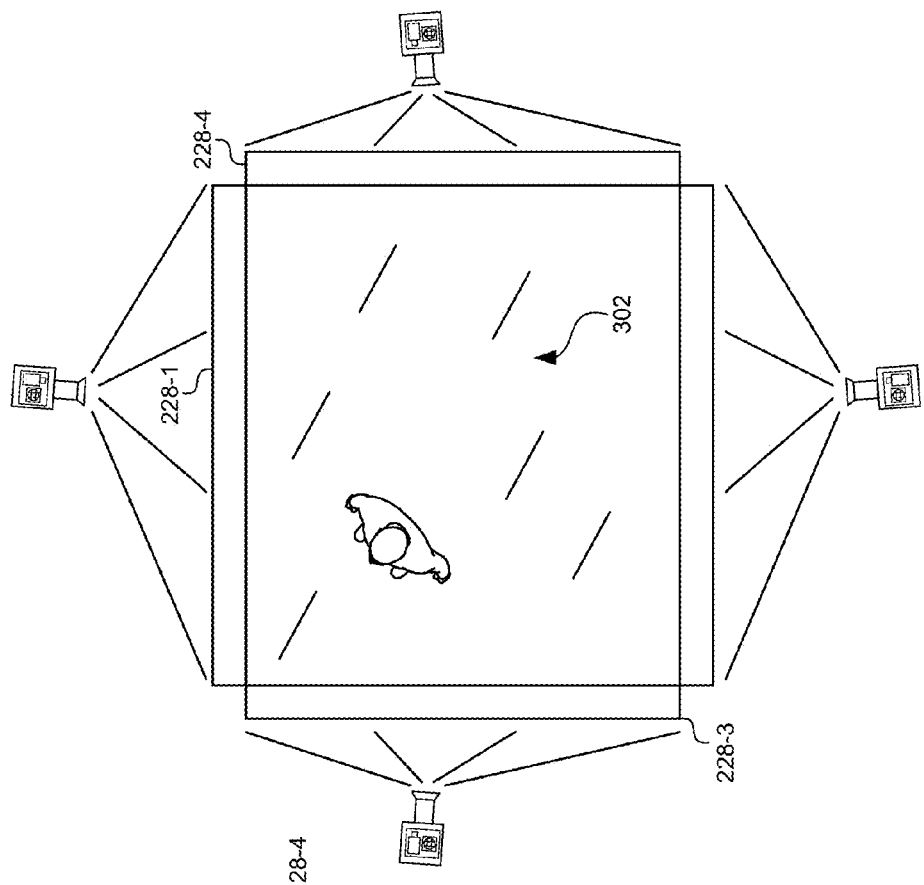
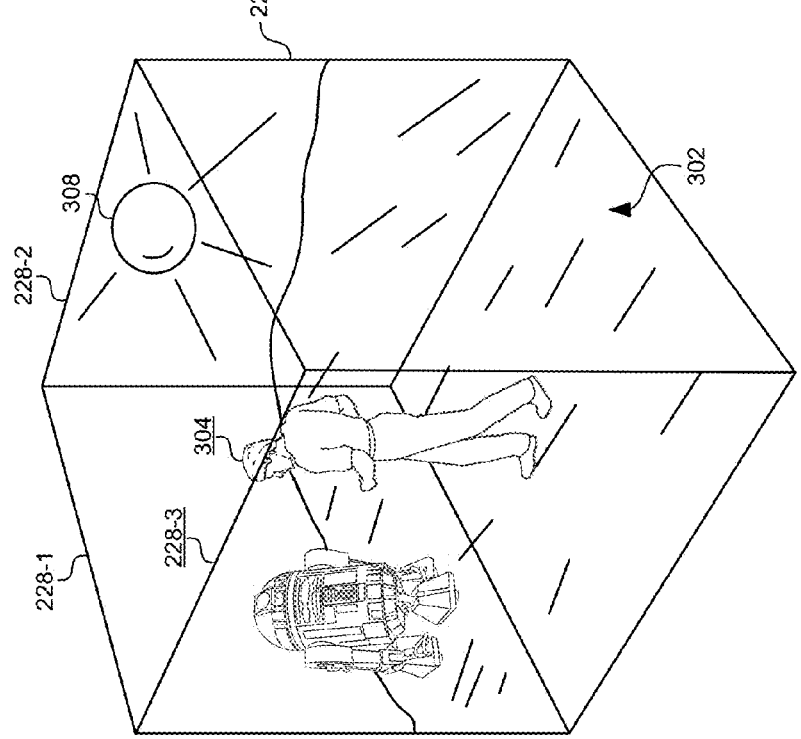
FIG. 3B
FIG. 3A

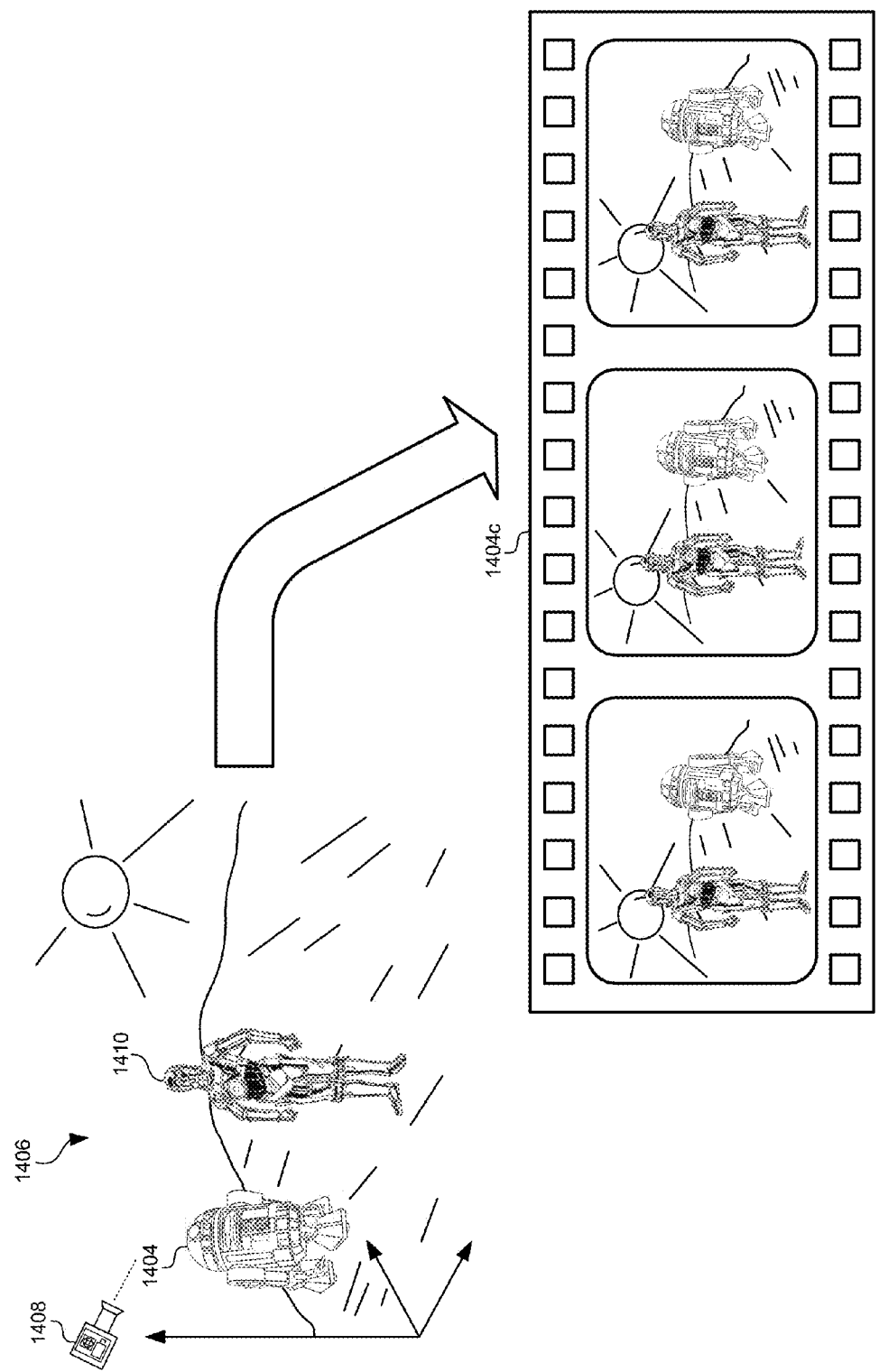

REAL-TIME CONTENT IMMERSION SYSTEM

CROSS-REFERENCES TO RELATED APPLICATIONS

This application claims the benefit of U.S. Provisional Application No. 62/004,121 filed May 28, 2014, titled "Providing Immersive and Interactive User Experiences," which is hereby incorporated by reference for all purposes. This application also claims the benefit of U.S. Provisional Application No. 62/005,731 filed May 30, 2014, titled "Immersion Photography with Dynamic Matte Screen," which is hereby incorporated by reference for all purposes.

This application is related to U.S. patent application Ser. No. 14/483,865 filed Sep. 11, 2014, titled "Immersion Photography with Dynamic Matte Screen," which is hereby incorporated by reference for all purposes.

BACKGROUND

Generally, content can be played for viewers in static environments where the content only occupies a small portion of the viewers' field of view. Viewers are also generally limited to viewing such content on a single display device, such as a television screen without any means for real-time interaction with the content. Although the content may have originated from complex virtual three-dimensional (3-D) scenes that have been rendered into sequences of two-dimensional (2-D) images, viewers are often unaware of the underlying complexity of the scene, as well as the different rendering options that were originally available.

BRIEF SUMMARY

In some embodiments, a method may include presenting a scene from linear content on one or more display devices in an immersive environment, and receiving, from a user within the immersive environment, input to change an aspect of the scene. The method may also include accessing 3-D virtual scene information previously used to render the scene, and changing the 3-D virtual scene information according to the changed aspect of the scene. The method may additionally include rending the 3-D virtual scene to incorporate the changed aspect, and presenting the rendered scene in real time in the immersive user environment.

In some embodiments, a system may include one or more display devices forming an immersive environment, one or more processors, and one or more memory devices including instructions that, when executed by the one or more processors, cause the one or more processors to perform operations. The operations may include presenting a scene from linear content on the one or more display devices in the immersive environment, and receiving, from a user within the immersive environment, input to change an aspect of the scene. The operations may also include accessing 3-D virtual scene information previously used to render the scene, and changing the 3-D virtual scene information according to the changed aspect of the scene. The operations may additionally include rending the 3-D virtual scene to incorporate the changed aspect, and presenting the rendered scene in real time in the immersive user environment.

In some embodiments, a non-transitory computer-readable medium may include instructions that, when executed by the one or more processors, cause the one or more processors to perform operations. The operations may include presenting a scene from linear content on the one or more display devices in the immersive environment, and receiving, from a user within the immersive environment, input to change an aspect of the scene. The operations may also include accessing 3-D virtual scene information previously used to render the scene, and changing the 3-D virtual scene information according to the changed aspect of the scene. The operations may additionally include rending the 3-D virtual scene to incorporate the changed aspect, and presenting the rendered scene in real time in the immersive user environment.

Some embodiments may also include one or more of the following features in any combination and without limitation. The immersive environment may include a panoramic display of the scene, and the one or more display devices may include a display on a floor of the immersive environment. The linear content may include a previously released motion picture. The input to change the aspect of the scene may include a user interaction with the aspect of the scene displayed on the one or more display devices in real time. The aspect of the scene may include a behavior or dialogue of a CGI character. The aspect of the scene may include a perspective from which the scene was rendered. The method/operations may also include tracking motion of a second user, and using the motion of the second user to drive a CGI character in the 3-D virtual scene.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3B illustrate one example of an immersive environment, according to some embodiments.

FIG. 14C illustrates another example of how content can be manipulated in real time, according to some embodiments.

DETAILED DESCRIPTION

Figure 1:
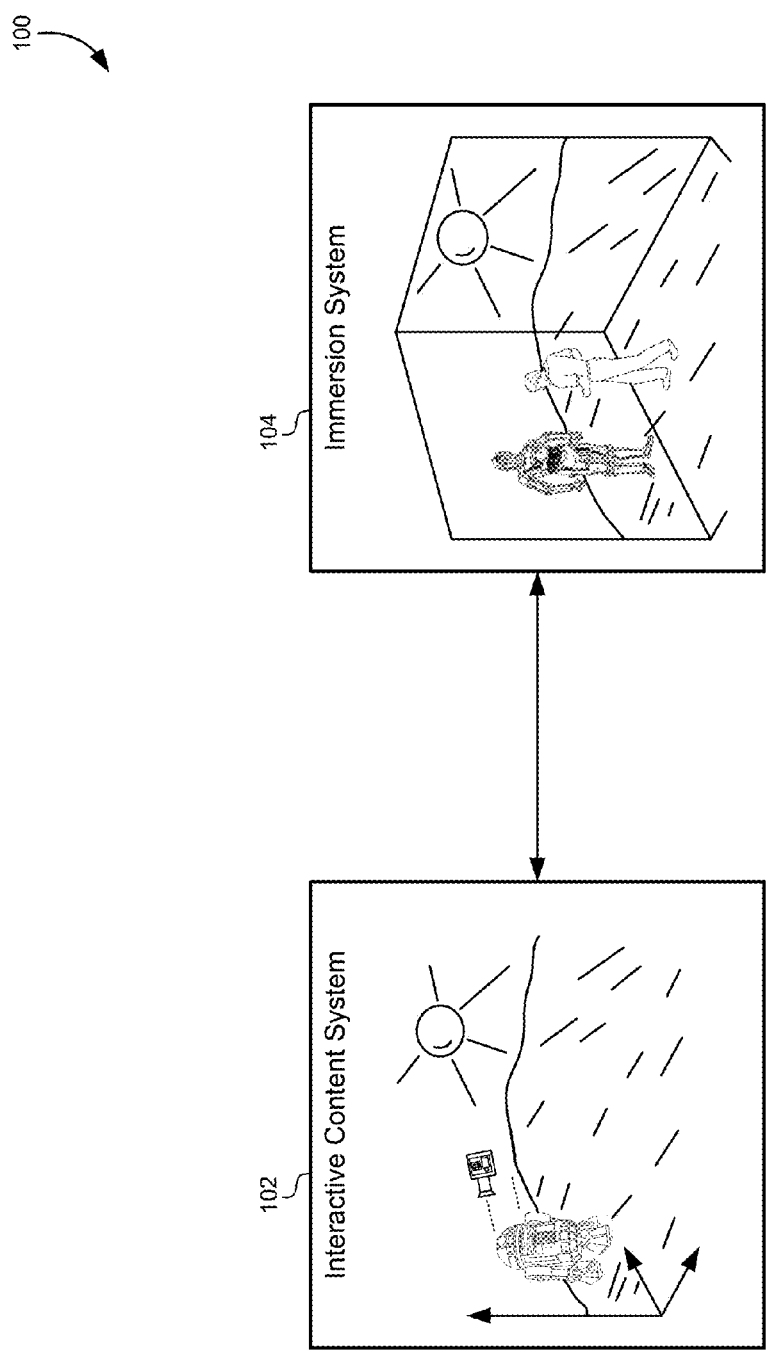
FIG. 1 illustrates a block diagram of an interactive content and immersion system.

Described herein are embodiments for providing an interactive and immersive content experience for a user. FIG. 1 illustrates a block diagram 100 of an interactive content and immersion system. The system may include an interactive content system 102 as well as an immersion system 104. A user can enter the immersive environment provided by the immersion system 104 and experience a panoramic, virtual-reality situation where content is presented such that the user feels as though he/she is part of the scene. The immersion system 104 can track the user location and determine when the user is interacting with the presented content. The interactive content system 102 can supply rendered images to the immersion system 104 that are responsive to the user's interactions. In some embodiments, the interactive content system 102 can render images from the user's point of view with respect to the immersion system 104 and provide real-time renders (e.g., renders performed at interactive frame rates) of the interactive content as the user moves throughout the environment of the immersion system 104. In some embodiments, users can control aspects of the interactive content, such as camera angles, characters, animation models, and so forth, to customize scenes in the interactive content system 102.

By combining the interactive environment of the immersion system 104 with the real-time responsiveness of the interactive content system 102, users can experience a lifelike interaction with the content. For example, the interactive content system 102 can include a linear copy of the *Star Wars: Episode I* movie. Some scenes of this movie were generated using rendered 3-D characters and scenery. Instead of simply watching prerendered images, the system gives the user the opportunity to step into the scene. The interactive content system 102 can have access to the virtual 3-D scenes that were used to create the original movie. When the user steps into the immersion system 104, the user can choose to relive the scene through the perspective of one of the characters. For example, the user could experience the scene as Obi-Wan Kenobi speaking to R2-D2 on Tatooine. The immersion system 104 can track the location of the user within the immersive environment, and the interactive content system 102 can provide a real-time render of the scene from the perspective of the user as Obi-Wan Kenobi. For example, objects in the immersive environment can be displayed as being a certain distance from the user based on the object's distance from the Obi-Wan Kenobi character and a pre-defined height for the Obi-Wan Kenobi character. In some embodiments, additional features may be added to enhance the entertainment experience. For example, immersion system 104 can receive interactions from the user, and the interactive content system 102 may include a game engine that generates responses from the 3-D virtual scene. For example, the user playing the part of Obi-Wan Kenobi can walk away from R2-D2. Immersion system 104 can track the motion of the user in the immersive environment and the interactive content system 102 can generate a reaction from R2-D2, such as following the user. In some embodiments, the motion/position of the user can be tracked and used to drive a digital character that is displayed to a second user, either on the same set of display devices, or on another set of display devices in a different location. For example, R2-D2 could be driven by a first user and viewed by a second user, while C-3PO is driven by the first user and viewed by the second user. Both the first user in the second user can then interact with each other through the digital characters viewed on screen.

This is but one example of how an immersive interactive content system can enhance the user experience when viewing content. The following description will first discuss the immersion system 104 and will describe the different methods of presenting an immersive experience and receiving interactions from the user. Next, the following description will discuss the interactive content system 102 and will describe how content can be altered, presented, and generated to enhance the user experience.

Immersion System

Figure 2:
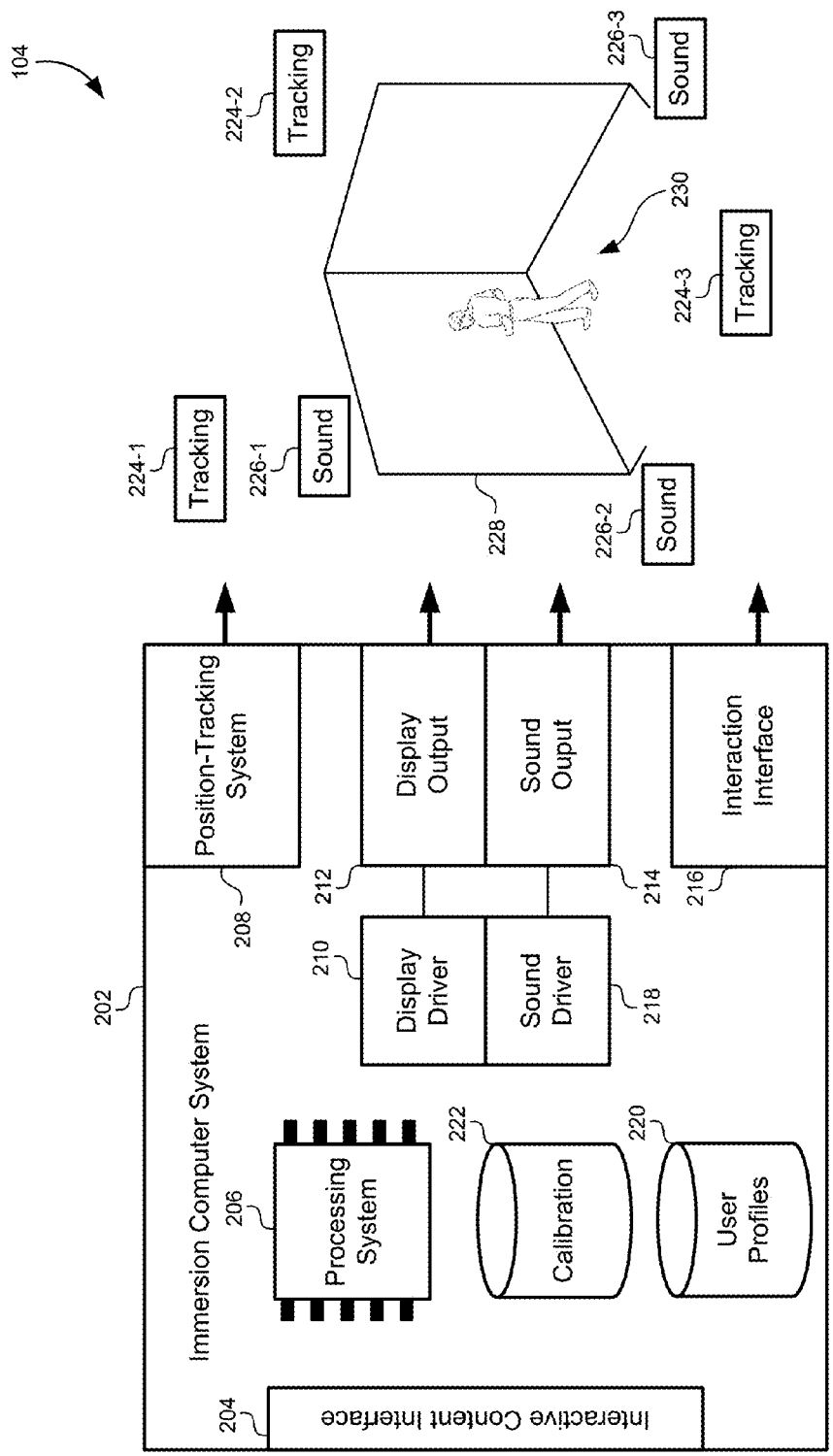
FIG. 2 illustrates a block diagram of the immersion system, according to some embodiments.

In some embodiments, a system may include one or more computing devices (e.g., server computers) and one or more immersive environment elements. FIG. 2 illustrates a block diagram of the immersion system 104, according to some embodiments. In this embodiment, an immersion computer system 202 can communicate with the interactive content system, drive outputs to the immersive environment elements, and process inputs and interactions from the user. The immersion computer system 202 can include an interactive content interface 204 configured to receive content from the interactive content system. The interactive content interface 204 may include wired and/or wireless communication ports, such as 802.11, Bluetooth, USB, parallel interfaces, and/or the like. Generally, content received from the interactive content system will be in the form of rendered 2-D images. The immersion computer system 202 can receive the 2-D images and configure the images for display to the user.

The immersion computer system 202 may also include a processing system 206 comprising one or more processing cores and one or more memory devices. The processing system 206 can coordinate communications between the various subsystems. A display driver 210 and a sound driver 218 can be coupled to a display output 212 and a sound output 214, respectively. The display driver 210 takes the 2-D images received from the interactive content system and formats the images to be displayed on one or more display devices 228 for the user. The sound driver 218 takes the sound portion of the interactive content and sends sound signals to one or more sound devices 226 for the user. The sound devices 226 may be distributed around the immersive environment to provide a surround-sound effect. As the user moves around the immersive environment, the characters or other digital assets in the rendered scene may change location relative to the user. The sound driver 218 can process audio from these characters/assets and direct the sound to a particular sound device 226 such that the user will hear the sound coming from the direction of the displayed character/asset. The sound devices 226 may include any common speakers. In some embodiments where the immersive environment is in a user's home, the sound devices 226 may be part of a home surround-sound system.

In addition to the sound devices 226, the immersive environment 230 may include the one or more display devices 228. The display devices 228 may be configured to project one or more images of various digital assets and/or backgrounds, such as physical environments, movie characters, etc. In one aspect, the display devices 228 may be configured to partially or wholly surround the immersive environment 230. For example, a group of display devices 228 may span each wall of a room to completely surround the room and any persons located within the room. As another example, a group of display devices 228 may partially surround an area by creating walls around the area. As still another example, a group of display devices 228 may partially surround an area by creating three walls around the area. In some embodiments, the display devices may additionally be configured to span a floor of an area. In one aspect, the display devices may also be suitable for generating three-dimensional images of assets (e.g., holograms) or backgrounds such that a user is able to perceive depth in the assets or backgrounds. Various configurations of the display devices 228 in the immersion environment 230 will be discussed in greater detail below.

The immersive environment 230 may also include one or more tracking devices 224 that are used to track the location of the user within the immersive environment 230. Various methods can be used to track the location of the user within the real-world coordinates of the immersive environment 230. These real-world coordinates can then be translated into a position in the 3-D virtual scene that is being processed by the interactive content system. A virtual camera in the 3-D virtual scene can be positioned at the location of the user, and in some cases, the virtual camera can be oriented in a direction of the sight line of the user. Real-time rendering of the virtual 3-D scene from the perspective of the user will be discussed in greater detail below.

Methods for tracking the location of the user may include using a GPS device, using RFID tags and radio transmitters/receivers, using depth sensors, and/or the like. Some embodiments may use one or more cameras aimed at the subject and calculate the location based on intersecting camera views. Some embodiments may track a center-of-mass of the subject, while some embodiments may track the location of the head of the subject. In some embodiments, the tracking devices 224 may include a plurality of cameras configured together to capture most or all of the immersive environment 230. The plurality of cameras can track fiducial markers on the user, such as Scotchlight balls, QR-like digital codes, or other visually distinguishable graphics. Some embodiments may perform a full motion capture of the user, such that the movements of the user can be used to animate a digital character. In motion capture situations, the subject 104 can wear a tracking helmet that records the location of the subject 104 and/or the orientation of the head of the subject 104. In other embodiments, the user can wear a pair of glasses or virtual-reality goggles that will record the orientation of the user's gaze.

The immersion computer system 202 may also include an interaction interface 216 that receives interactions from the user in the immersive environment 230. In some embodiments, the interaction interface 216 may receive sound captured by microphones in the immersive environment 230. This allows the user to speak to characters in the scene or to give voice commands to the immersion computer system 202. Some embodiments may also include a motion control sensor, such as the Kinect® sensor that captures gestures and motion of the user. These sensors can interpret specific gestures using an infrared projector and camera to track movements in the immersive environment 230. Sensors such as these can be used to both track the position of the user and to gather interactive data. For example, a user could punch at a character displayed on the display devices 228. These sensors will capture the punching motion through the interaction interface 216 and provide that information to the interactive content system. The punching motion could then be used to generate content that is reactive to the user's motion. For example the character at which the punch was directed could react by falling over. Content processing by the interactive content system will be discussed in greater detail below.

The immersion computer system 202 may also include a calibration data store 222 and a user profile data store 220. The various cameras, projectors, and sensors in the immersion environment 230 may be calibrated for specific users. For example, the immersive computer system 202 would generate sound and images differently for a very tall user than it would for a very short user. Additionally, users may be tracked differently based on their size and speed. User profiles for a voice recognition system may be tailored to recognize the voice characteristics of particular users. Users may also wish to store preferences about how certain voice and/or physical commands should be interpreted by the immersion computer system 202. For example, one user could wave their arms to start displaying video content, while another user could use the voice command "begin playing."

The immersion environment can in some cases present a panoramic view of a scene. For example, the display devices 228 may include vertical screens that surround the subject to varying degrees. Vertical screens may be curved. Some embodiments may use a single screen in front of the user, while some embodiments may use multiple screens that more fully surround the user. Some embodiments may also extend the display onto the floor and/or ceiling of the immersion environment. Some embodiments may mix the display devices 228 with other objects and/or lighting effects that are separate from the display devices 228, such as ring lights, spot lights, mobile phones, tablet computers, and so forth. For example, a second user can be positioned off to the side of the display devices 228 and can control a CGI character with which the user in the immersive environment can interact. The second user can control the CGI character through motion tracking, computer controls, voice commands, and so forth, as described in greater detail below.

Turning now to a detailed discussion of the display devices 228 and other configurations of the immersive environment 230, FIGS. 3A-3B illustrate one example of an immersive environment, according to some embodiments. In this specific example, the display devices 228 may include a set of projector screens configured to surround an area (e.g., create four walls surrounding an area). Each of the set of projector screens may be associated with one or more projectors positioned behind the screen to generate images on the screen. Additionally, a projector screen 302 may be placed on the floor of the area. A projector may be positioned above or overhead the area such that images can be displayed on the projector screen 302 on the floor of the area.

FIG. 3A illustrates a perspective view of an immersion environment with four walls acting as display devices 228.

FIG. 3B illustrates an overhead view of the same immersion environment. In this embodiment, five projectors project images onto each of the display devices 228, including the projector screen 302 on the floor. The walls can be coated with a white material, or they may be flexible projector screens themselves. Additionally, a ceiling may also act as a display device and receive a projected image.

The display devices 228 may include screens onto which images of elements of a 3-D virtual scene may be projected. These display devices 228 may also include active displays, such as LED panels, LCD panels, or other active display technologies. In some embodiments (not shown) the immersion environment may additionally or alternatively include physical devices that are used to present or suggest elements of the 3-D virtual scene. For example, robotic elements may be included that are controlled by actions or motions defined in a 3-D virtual scene received from the interactive content system. In another example, lasers can project intersecting light beams that create images or holograms within the immersion environment to suggest locations or movements of elements of the 3-D virtual scene. The images on the display devices 228 may be presented in a stereo format such that a user wearing 3-D glasses (e.g., 3D shutter glasses) may perceive 3-D assets or holograms from the images.

In this embodiment, the immersion environment is provided with scenes from the 3-D virtual scene rendered from the perspective of the user 304. In some embodiments, the assets (e.g., landscapes, characters, objects) of the 3-D virtual scene may be less detailed or of a lower resolution than what would be a final rendering of the 3-D virtual scene included in versions of the content to be presented to viewers outside of the immersion environment (e.g., a movie audience). The display devices 228 of the immersion environment include a landscape and characters (e.g., R2-D2) with which the user 304 may interact. Light sources 308 from the 3-D virtual scene may also be displayed by the display devices 228 in order to properly illuminate the user 304 in a manner that is consistent with the lighting of the 3-D virtual scene that is being displayed.

As the user 304 moves within the immersion environment, the display devices 228 can display updated images rendered in real-time from the 3-D virtual scene. As used herein, the term "real-time" is used to describe images that are rendered and displayed at frame rates that facilitate real-time interaction between the user and the content. Real-time frame rates may also be described as "interactive" frame rates. In some embodiments, this may be 1 frame per second, 5 frames per second, 10 frames per second, 15 frames per second, 20 frames per second, 30 frames per second, 40 frames per second, and/or the like.

As described above, tracking technologies can constantly monitor the position of the user 304 within the immersion environment. This location can be provided in real-time to a rendering engine in the interactive content system to update the position of the virtual camera in the 3-D virtual scene. The computer system can perform a real-time render on the virtual 3-D scene from the updated camera position and provide a streaming video sequence of images to be displayed on the display devices 228.

In some embodiments, the sensors of the system may track the location/movement of the user 304. For example, the sensors may track one or more markers (e.g., spherical white markers) affixed or included on 3D glasses, clothing, or other items worn by a user 304. Based on the markers, the system may adjust the environment and characters presented to the user. The adjustments may enable the user 304 to perceive that he/she is moving relative to assets and/or environments of an item of content. In this way, the content displayed to the user 304 can appear to be integrated into the real world. In one aspect, the system may include one or more speakers presenting audio. The audio presented by the system may be adjusted based on the location/movement of the user 304 and/or the location/movement of the digital assets.

By allowing the user 304 to move within the immersion environment, and by allowing objects and characters in the 3-D virtual scene to move, talk, and/or otherwise interact with the user 304, the subject 202 can be provided with a more realistic presentation of the content than would otherwise be available. For example, R2-D2 can move from left to right, and the user 304 would be able to walk with R2-D2 through the scene. Additionally, as the user 304 turns towards the light source 308, the illumination on the user 304 will be consistent with the lighting that would be present if the user 304 were actually inserted into the 3-D virtual scene. Generally, the display devices 228 may be said to display a visual representation of the 3-D virtual scene. This visual representation may include still images, as well as video sequences. As the user physically moves within the immersive environment, the depiction of the 3-D virtual scene on the display devices 228 will change dynamically. For example, as the user takes a few steps forward, and object displayed by the display devices 228 in front of the user will grow bigger. The size and other details of the projected images can be calculated by ascertaining the position of the user in the immersive environment, and rendering the 3-D virtual scene in real-time from the perspective of the user in the immersive environment. The picture plane of the rendered scene can be oriented and positioned in the 3-D virtual scene relative to the camera position so as to be congruent with the position and orientation of the display devices 228 and the position and orientation of the user in the immersive environment.

In some embodiments, the immersion environment of FIGS. 3A-3B need not be limited to experiencing real-time renders of a 3-D virtual scene. This example is merely exemplary and not meant to be limiting. In other embodiments, the immersion environment can be used to experience linear content in an immersive setting. The immersion environment can also be used for videogame experiences, sporting events, music concerts, or any other type of video entertainment where the user would enjoy and benefit from being inserted into the middle of the action. For example, it is now common for a wire-suspended camera to be navigated about a sporting event. Users in the immersive environment could view the game from the perspective of that camera and see a panoramic view of the surroundings. The helmets or other uniform equipment of an athlete may be fitted with cameras that transmit a real-time panoramic video feed to the immersive environment. The user in the immersive environment could then see what the athlete sees, and replay highlights from the athlete's perspective.

Figure 4B:
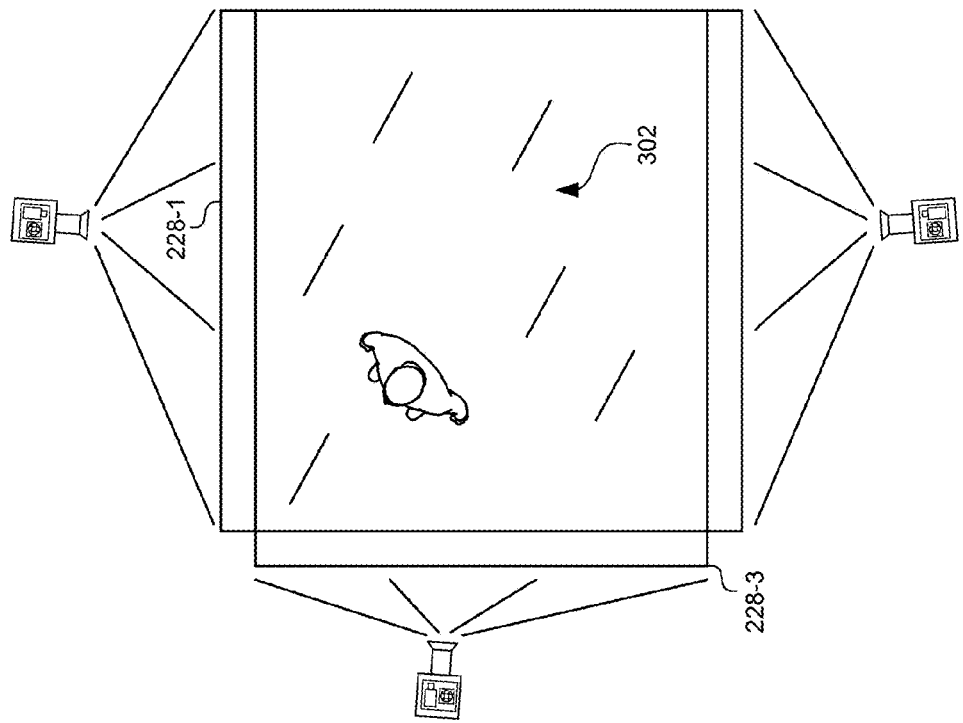
FIGS. 4A-4B illustrate an alternate implementation of the immersive environment, according to some embodiments.
Figure 4A:
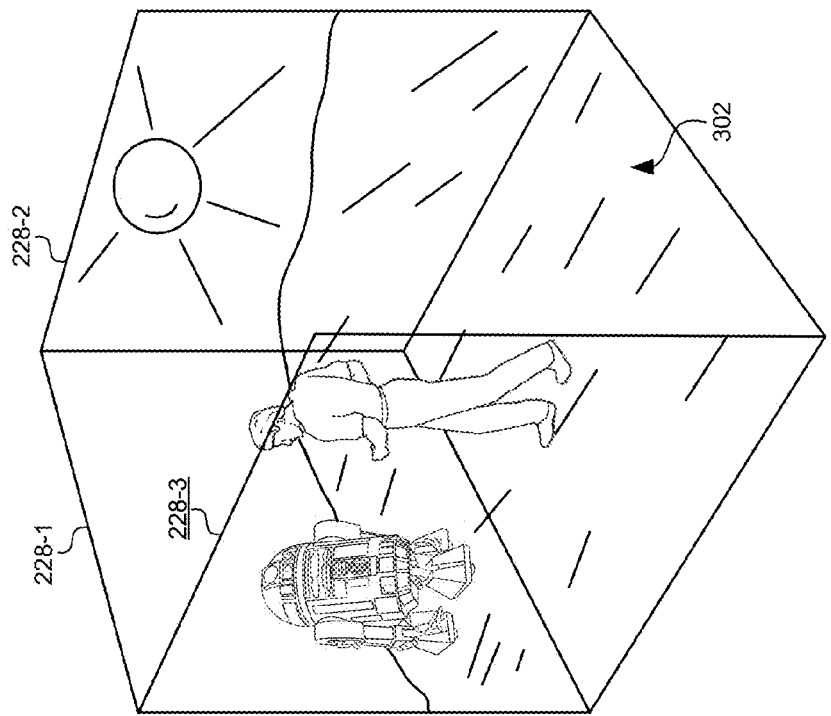

FIGS. 4A-4B illustrate an alternate implementation of the immersive environment, according to some embodiments. In this embodiment, the immersive environment includes three display devices 228 forming vertical walls around an area. Additionally, the floor may be used as a fourth display device 302 that receives an image projected from overhead. As is the case in FIGS. 3A-3B, the display devices 228 receive images from projectors positioned behind the display devices 228. By projecting from the rear, the projectors can avoid casting a shadow from the user onto the display devices 228. When facing forward towards display device 228-1, this three-walled configuration can provide the user with immersive imagery both directly in the user's line of sight and in the user's left and right periphery vision.

Figure 5B:
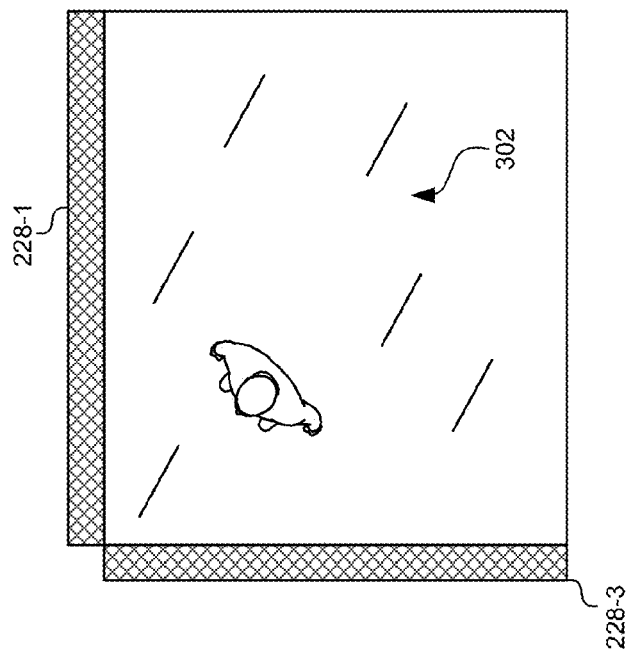
FIGS. 5A-5B illustrate yet another implementation of the immersive environment, according to some embodiments.
Figure 5A:
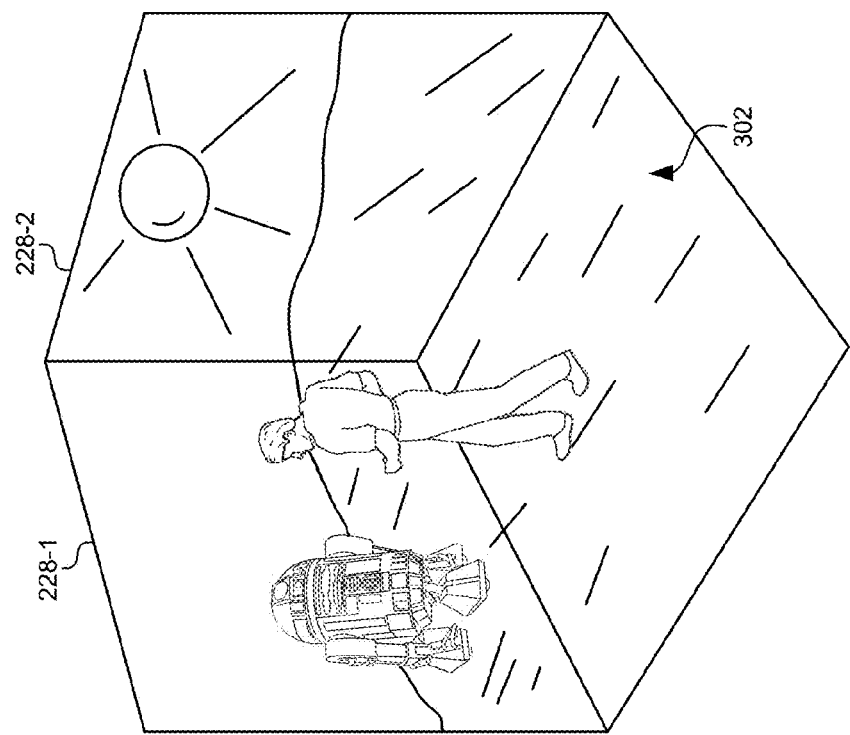

FIGS. 5A-5B illustrate yet another implementation of the immersive environment, according to some embodiments. In this embodiment, the immersive environment includes two display devices 228 forming vertical walls around an area. Again, the floor may be used as a third display device 302 that receives an image. In this two-walled embodiment, the user may typically face towards the corner between display device 228-1 and display device 228-2. Instead of receiving projected images, the display devices 228 in this embodiment are active displays. For example, instead of projection screens, the display devices 228 may be formed by LED, LCD, or plasma screens that form the walls of the immersive environment. In some embodiments, the display devices 228 need not cover the entirety of the walls in the immersive environment. Instead, the immersive environment may be formed by placing a few large flat-panel televisions on the wall. Although this configuration may not provide as immersive an experience as a full-wall display, it may be used for rapid prototyping, testing content scenes with users before final production, and/or the like.

Figure 6B:
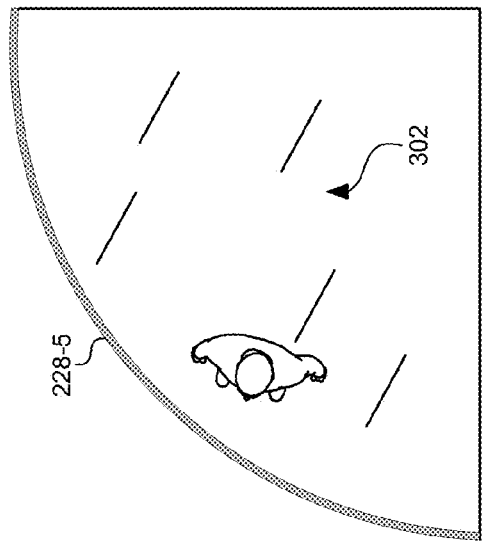
FIGS. 6A-6B illustrate another implementation of the immersive environment, according to some embodiments.
Figure 6A:
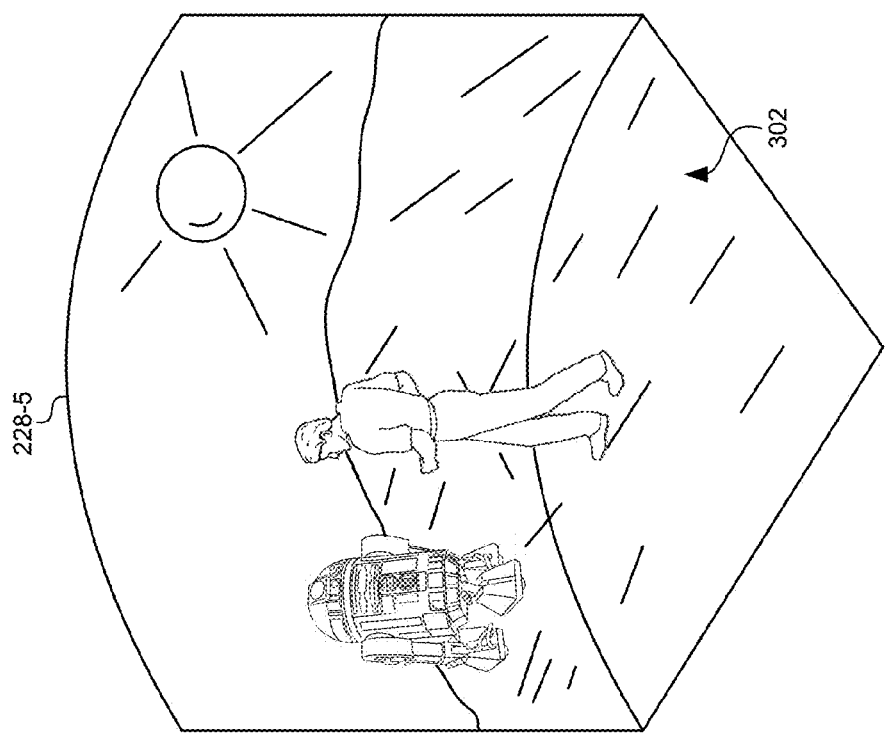

FIGS. 6A-6B illustrate another implementation of the immersive environment, according to some embodiments. This embodiment is comprised of a single, curved display device 228-5. The curved display device 228-5 can be configured to receive a projected image (e.g. a projection screen) or to generate an image (e.g. an active display). The curved display device 228-5 may offer advantages, such as eliminating visual seams between display devices that may subconsciously remind the user that they are not in a real-world environment.

Figure 7B:
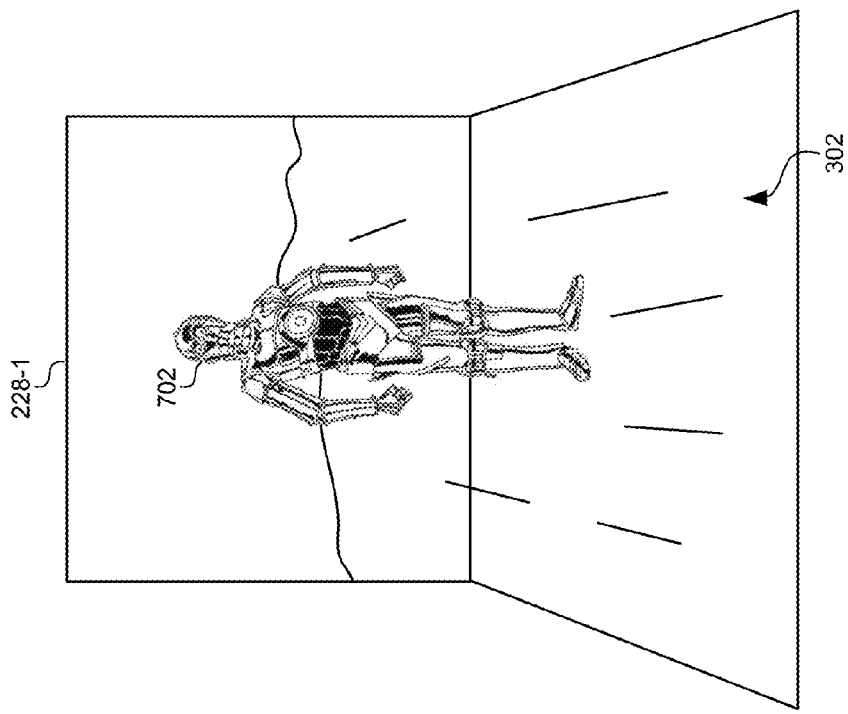
FIG. 7B illustrates a view of a projection from a user's perspective, according to some embodiments.
Figure 7A:
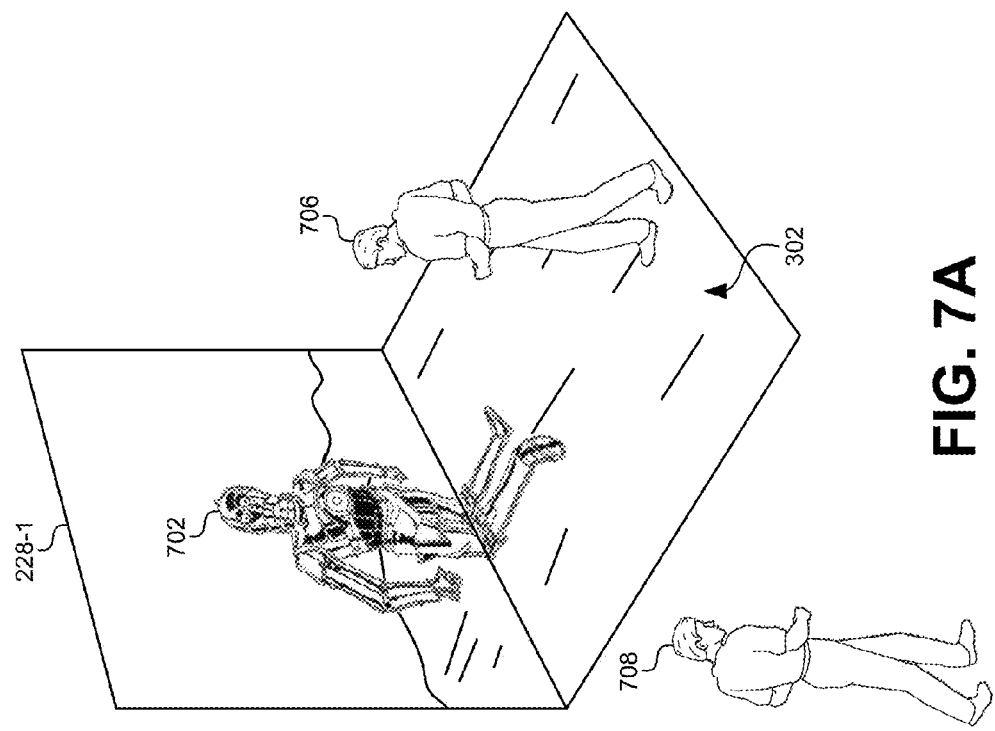
FIG. 7A illustrates a view of a projection from an outsider's perspective, according to some embodiments.

FIG. 7A illustrates a view of a projection from an outsider's perspective, according to some embodiments. The immersion system or the interactive content system can tailor the 2-D images that are displayed on the display devices 228-1, 302, such that they appear to the user to be a continuous visual scene. As described elsewhere herein, the 3-D virtual scene can be rendered by the interactive content system from the perspective of the location of the user in the immersive environment. For example, the location of the user can be tracked and/or the direction of the user's gaze can be determined by sensors, gaze detection, tracking devices, and/or the like. The location of the user's head and/or the direction of the user's gaze can be used to position and orient a virtual camera in the 3-D virtual scene. Two-dimensional images can then be rendered from the perspective of the virtual camera and displayed on the display devices 228-1, 302.

In order to make the images on the display devices 228-1, 302 appear to be part of a continuous scene, they may need to be skewed to conform to the size and orientation of the display devices 228-1, 302. While the user will view the skewed images as a continuous scene, people observing the scene from a location away from the user may observe the skewed images as an obvious distortion. By way of example, a character 702 is displayed display devices 228-1, 302 standing in front of the user 706. If the character 702 were farther away from the user 706, the character 702 could be displayed entirely on display device 228-1. However, as the character 702 comes closer to the user 706, the character 702 will begin to be displayed on display device 302. In FIG. 7A, the legs of C-3PO are displayed on display device 302, while C-3PO's upper portion is displayed on display device 228-1. From the perspective of an outsider 708, the display of character 702 appears to have obvious distortions, because the scene is being rendered from the perspective of the user 706, and not the perspective of the outsider 708.

FIG. 7B illustrates a view of a projection from a user's perspective, according to some embodiments. From the perspective of the user 706, the character 702 appears to be continuously rendered on the display devices 228-1, 302. Because digital assets can be displayed on the display devices and skewed according to the perspective of the user 706, the user 706 will tend to very quickly disregard seams between the display devices 228-1, 302.

Figure 8:
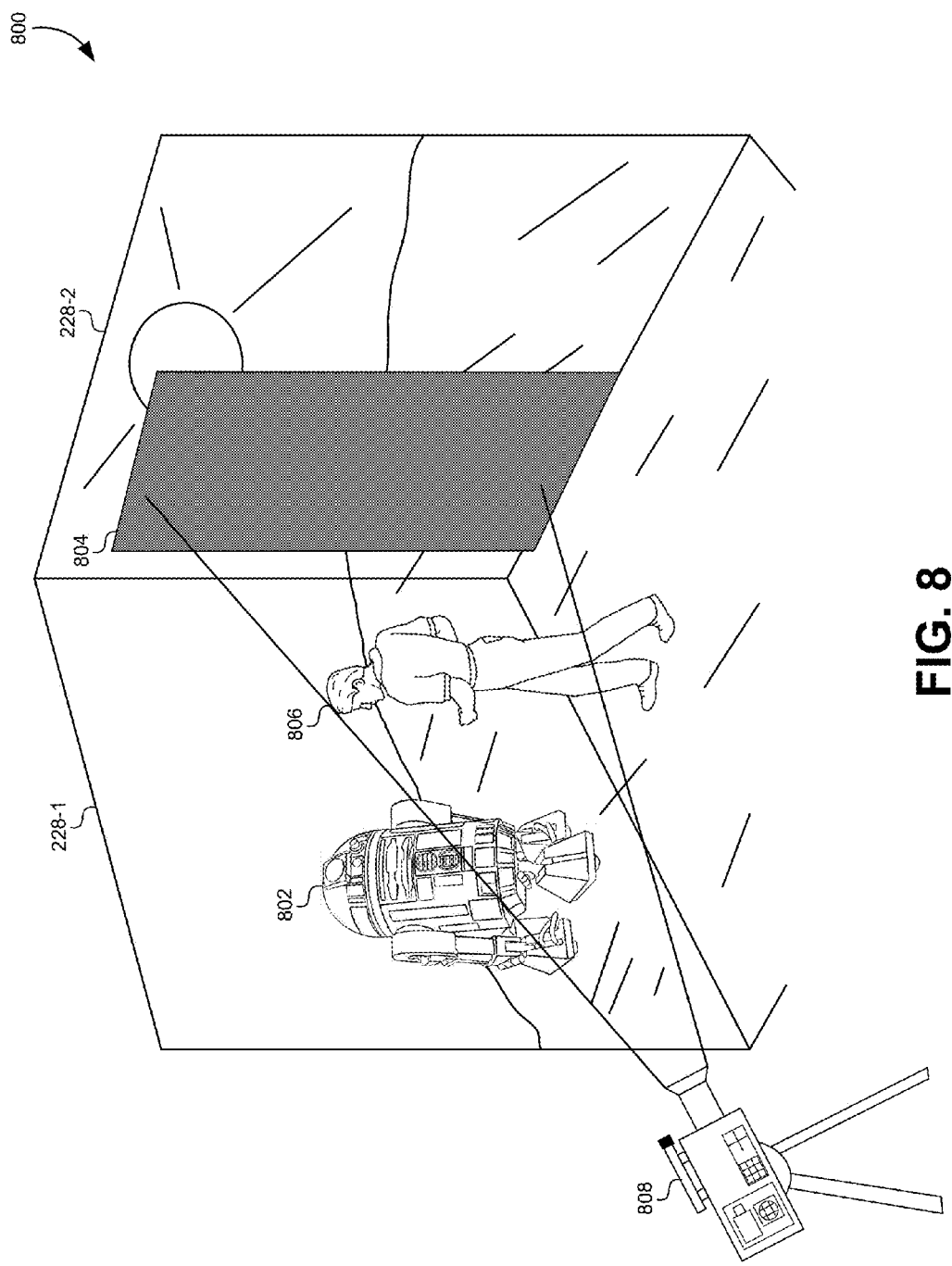
FIG. 8 illustrates a diagram of a dynamic matte screen that can be displayed on portions of the display devices, according to some embodiments.

FIG. 8 illustrates a diagram 800 of a dynamic matte screen that can be displayed on portions of the display devices, according to some embodiments. In some instances, for the capture of actor performances, a dynamic "green screen," "chroma-key background" or some other matte 804 may be presented by the display device 228-2 in a portion of a display behind the user 806. The dynamic green screen 804 may move according to the location/movement of the user 806 and/or the location/movement of a camera 808 (which may also have a communications link with the system) capturing the performance of the user 806. This dynamic green screen can be sized to interfere with as little of the presentation of the 3-D virtual scene by the display devices 228 as possible. For example, the dynamic green screen 804 can be sized slightly larger than a projection of the user 806 onto the display device 228-2 as seen by the camera 808. As the user 806 moves forward or backward, the dynamic green screen 804 can also move forward and backward accordingly. As the user 806 moves towards the camera 808, the dynamic green screen 804 can increase in size. As the user 806 moves away from the camera 808, the dynamic green screen 804 can decrease in size. Similarly, if the camera 808 were to move forward/backward or toward the user 806 or away from the user 806, the dynamic green screen 804 could be resized accordingly. In some embodiments, the dynamic green screen 804 can be rectangular shaped, while in other embodiments, the dynamic green screen 804 can conform more closely to the shape of the user 806, having the shape of the user's shadow with arms, legs, and so forth. The dynamic green screen 804 may be continuously displayed, or it may be interleaved in alternating frames of the display device 228-2.

The dynamic green screen 804 may be particularly useful for extracting a performance of the user 806 from the immersion environment. Many modern movies include computer-generated scenery and characters with which live actors are expected to interact. Previously, the user 806 would need to give a dramatic performance to a green screen background with no visual cues or interaction with CGI characters that would be inserted into the scene afterwards. The immersion environment can present a scene with CGI characters and scenery to the user 806 as he/she performs the scene. For example, Luke Skywalker can talk with R2-D2 802 and follow his movements as R2-D2 802 moves throughout the scene. Not only will Luke's gaze and performance be oriented in the correct direction, but the lighting will be consistent with the eventual 3-D virtual scene as he turns towards a light source like the sun. A full description of the operation of a dynamic green screen can be found in the commonly-assigned U.S. patent application Ser. No. 14/483,865 filed Sep. 11, 2014 titled "Immersion Photography with Dynamic Matte Screen" which is hereby incorporated by reference in its entirety for all purposes.

Figure 9:
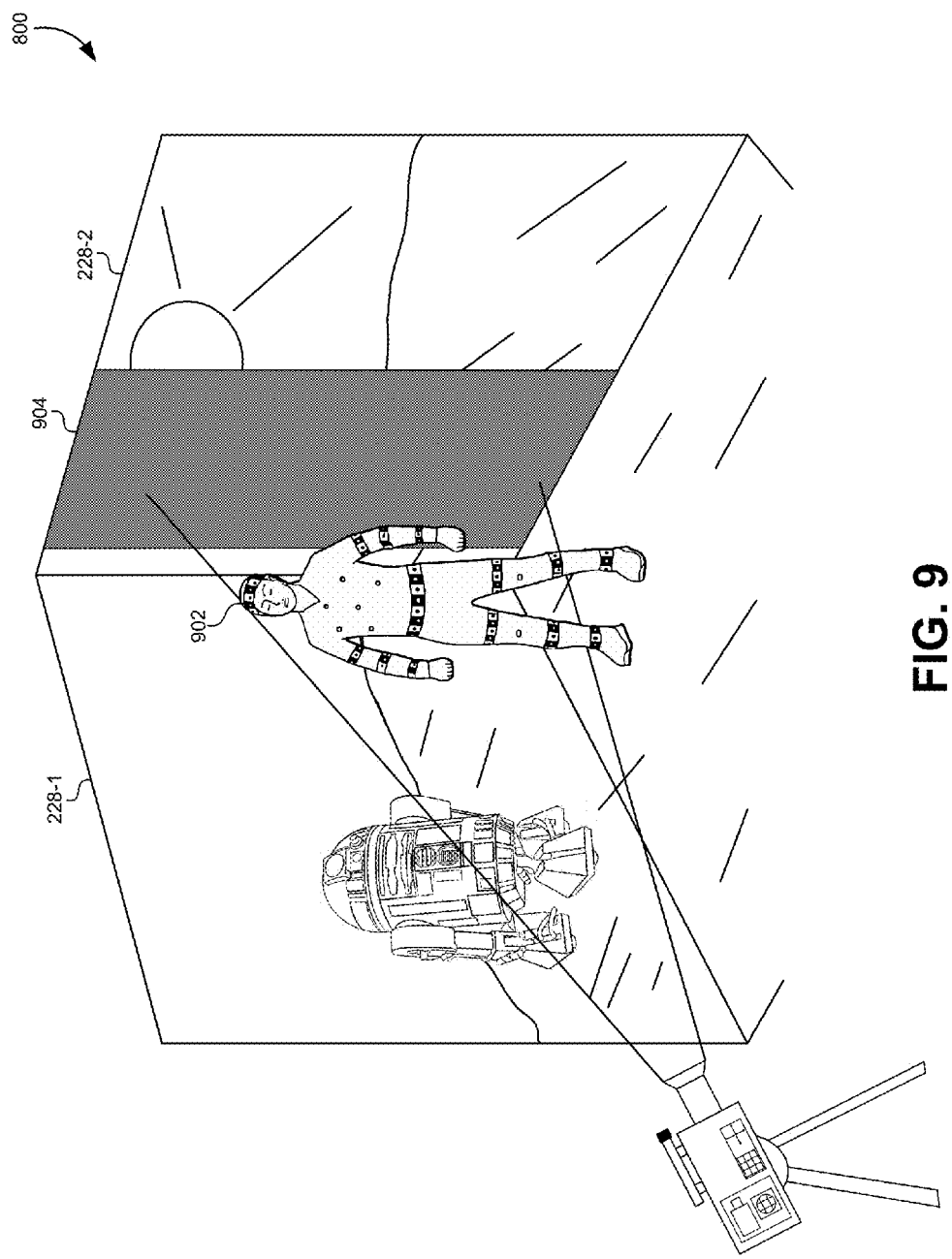
FIG. 9 illustrates a diagram of how the immersion environment can be used for real-time motion capture, according to some embodiments.

FIG. 9 illustrates a diagram 800 of how the immersion environment can be used for real-time motion capture, according to some embodiments. In addition to presenting interactive content for a user 902, the immersive environment can also capture a performance of the user 902 as he/she interacts with the immersive environment. The performance of the user 902 may then be used to drive another digital character. The system may load a character asset that is controllable by the user 902. As an example, the user 902 may have a 3-D hologram of Mickey Mouse interact with an environment that includes other generated holographic characters (e.g., Donald Duck). A user may control a character in any suitable manner. For example, the sensors of the system may track the movement of the user 902. Based on the movement identified by the system, the system may cause a hologram of a character controlled by the user to move in a similar manner. Such movement of the hologram of the character may be presented to the user 902 in real or substantial real-time over the display devices 228. In some instances, the user-controlled character may interact with other users who are within the immersive environment surrounded by the display devices 228. In one aspect, the system may process the movements to determine whether the hologram of the character has interacted with other assets. Based on such a determination, the system may cause modifications to the other assets and/or character. For example, the user may cause the hologram of the character to swing a bat at a hologram of a baseball. Responsive to the swing, the system may alter the trajectory of the baseball hologram that is displayed. In one aspect, a user controlling a character may be outside of the immersive environment surrounded by the display devices 228 in a second different area. One or more sensors of the system may be directed at the second different area in order to capture the movement of the user.

As described above, a volumetric representation of the user 902 may be ascertained by the system using a KINECT®-style sensor that projects infrared energy that is received by a camera. This volumetric representation may be used to drive the actions of another digital character. In other embodiments, the user 902 may wear graphic fiducials that can be tracked by a motion capture camera system to precisely capture the joint and limb movements of the user 902.

Figure 10B:
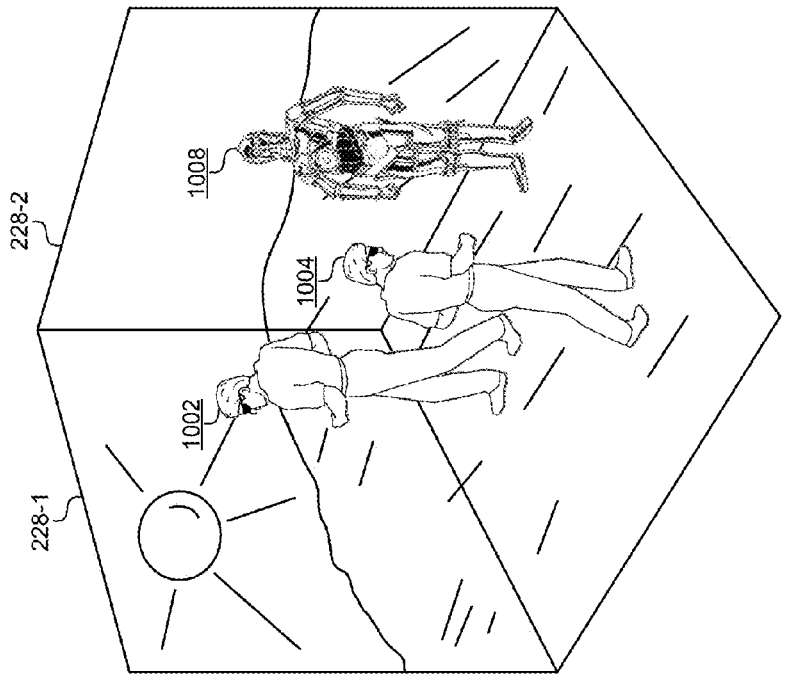
FIGS. 10A-10B illustrates an immersive environment that includes two or more users, according to some embodiments.
Figure 10A:
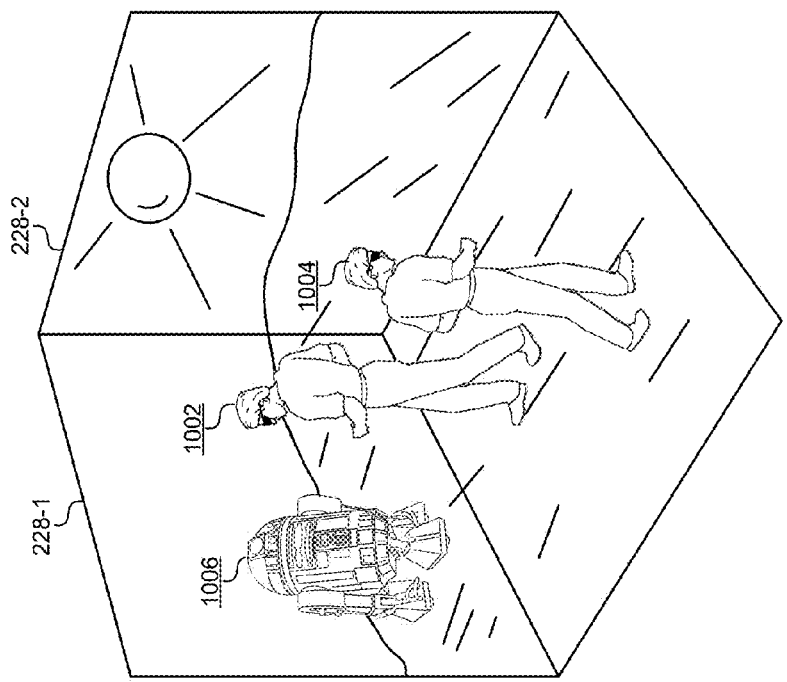

FIGS. 10A-10B illustrates an immersive environment that includes two or more users, according to some embodiments. The system may dynamically adjust the images presented on the display devices 228 such that two or more users can interact with an environment and/or assets of the virtual 3-D scene. Specifically, multiple users facing different areas or at different locations within an area may require different images to be presented in order to experience the effect of being within a scene with a same item of content. As such, the display devices 228 may be synchronized with a set of shutter glasses worn by the users. Such synchronization may occur over a communicative link (e.g., bluetooth link) between the system and the shutter glasses. In one instance, the display devices 228 may present images meant for a first user 1002 during a first time, where the images are based on the location/movement of the first user 1002. At that time, the shutter glasses of the first user 1002 may be in a non-opaque mode, enabling the first user 1002 to view the images. At this same time, the shutter glasses of a second user 1004 may be in an opaque mode, such that the second user 1004 cannot view the images. At a second time, the display devices 228 may present images meant for the second user 1004 during a second time, where the images are based on the location/movement of the second user 1004. At the second time, the shutter glasses of the second user 1004 may be in a non-opaque mode, enabling the second user 1004 to view the images. At this same time, the shutter glasses for the first user 1002 may be in an opaque mode. In one embodiment, the images meant for the first user 1002 and the images meant for the second user 1004 may alternate over time. In one embodiment, the images may alternate at a rate equal to or greater than 10 frames per second. In another embodiment, the images may alternate at a rate faster than what a human can perceive. As a result, the first user 1002 and the second user 1004 each may view their own images as occuring continuously or serially.

In FIG. 10A, the shutter glasses of the first user 1002 may be in a non-opaque mode allowing the first user 1002 to view the images. For example, the first user 1002 may see R2-D2 1006 and have the sun to his/her right. At this time, the shutter glasses of user 1004 may be opaque. Next, during a subsequent frame illustrated by FIG. 10B, the shutter glasses of the first user 1002 may become opaque and the shutter glasses of the second user 1004 may become non-opaque. Now the display devices 228 present the 3-D virtual scene from the perspective of the second user 1004. The second user 1004 may be located in a different area of the 3-D virtual scene than the first user 1002, and may interact with different characters and/or assets. For example, the second user 1004 may be interacting with C-3PO 1008 with the sun at his/her left.

In some embodiments, the first user 1002 and the second user 1004 may interact with each other in a real-life fashion. For example, the first user 1002 can interact and talk directly with the second user 1004, while both users 1002, 1004 interact with digital characters and scene elements as seen through their respective shutter glasses. In other embodiments, the users 1002, 1004 would not interact and talk with each other directly, but rather would do so through the immersion environment. In FIGS. 10A-10B, the first user 1002 is directing his/her interactions to display device 228-1. In contrast, the second user 1004 is directing his/her interactions to display device 228-2. The motion capture of the second user 1004 can drive a digital character in the view of the first user 1002, such as R2-D2 1006. As the second user 1004 moves within the immersion environment, R2-D2 1006 will move as viewed by the first user 1002. Similarly, the motion of the first user 1002 can drive the motion of another digital character, such as C-3PO 1008. As the first user 1004 moves within the immersion environment, C-3PO 1008 will move as viewed by the second user 1004.

If the display devices 228 are large enough, each user 1002, 1004 may be assigned one particular display device. For example, the first user 1002 may be assigned to display device 228-1, and the second user 1004 may be assigned to display device 228-2. In these embodiments, the alternating frames and shutter glasses as described above may continue to be used. Alternatively, the users 1002, 1004 can remove their shutter glasses and simply view the display device, 228-1, 228-2 to which they are respectively assigned without alternating frames.

In some embodiments, the display devices and the immersion environment may be implemented using virtual-reality goggles. In this case, the first user 1002 and the second user 1004 can substitute their shutter glasses for the virtual-reality goggles. The system can still track the location of the users 1002, 1004 and provide a digital representation on the display of each others' virtual-reality goggles. For example, as the first user 1002 looks towards the his/her left, he/she will see R2-D2 1006. However, as the first user 1002 looks towards his/her right, he/she will see the second user 1004, or a CGI character driven by the motion of the second user 1004.

Figure 11:
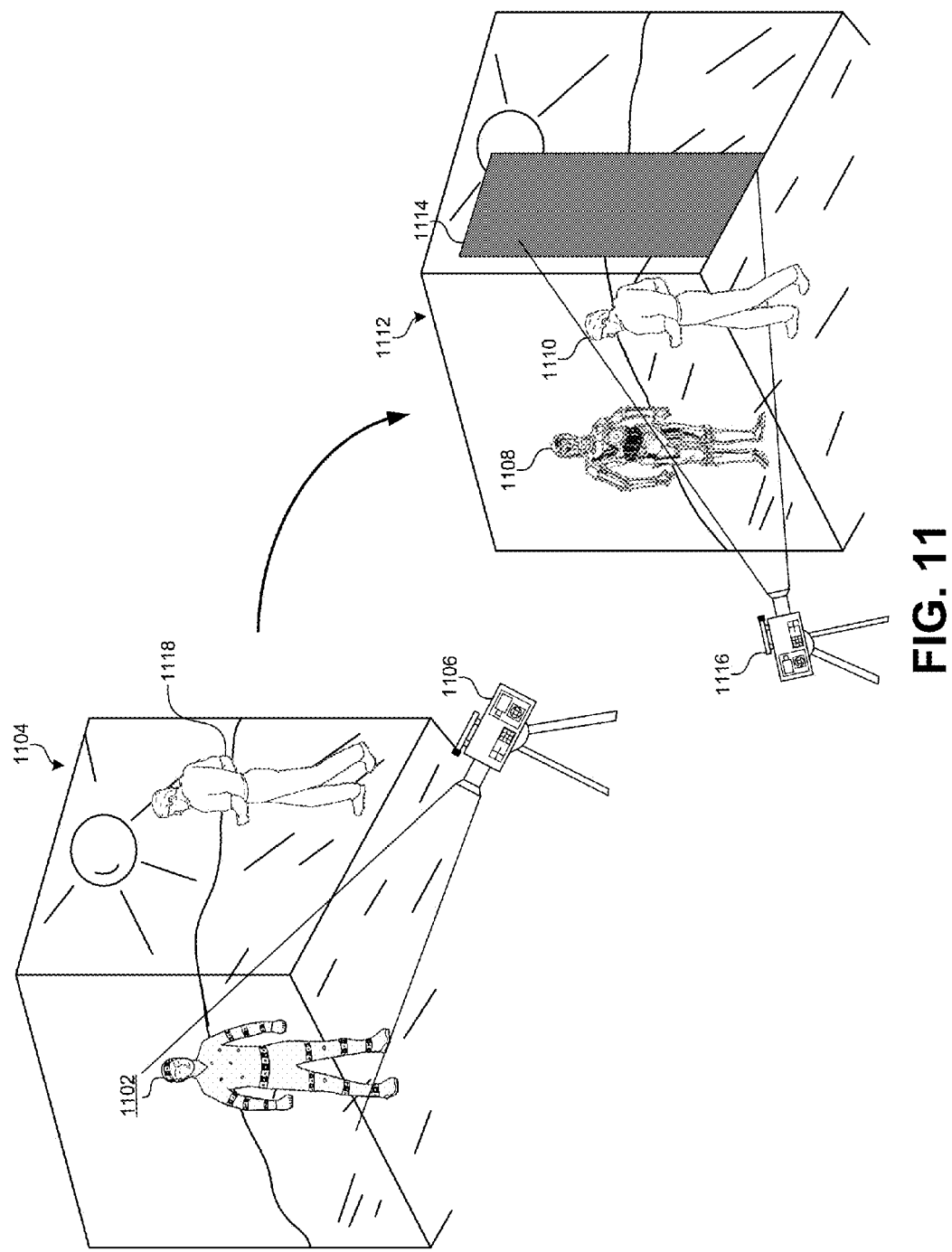
FIG. 11 illustrates an embodiment for merging the experience of two or more users in separate immersion environments, according to some embodiments.

FIG. 11 illustrates an embodiment for merging the experience of two or more users in separate immersion environments, according to some embodiments. A first immersive environment 1104 with a first user 1102 can be communicatively coupled to a second immersive environment 1112 with a second user 1110. The two immersive environments 1104, 1112 may be co-located in the same room, the same building, or the same facility. Alternatively, the two immersive environments 1104, 1112 may be separated by a considerable geographic distance. For example, the two immersive environments 1104, 1112 may be located in the homes of the users 1102, 1110 respectively. In this case, the two immersive environments 1104, 1112 can communicate real-time images back and forth over a network such as the Internet.

In this particular embodiment, the first user 1102 can be fitted with a motion capture suit or otherwise identified by motion capture fiducials such that the motion of the first user 1102 can be used to drive an animation of a CGI character. The first immersive environment 1104 can display scenes from the 3-D virtual scene that are shared between the first immersive environment 1104 and the second immersive environment 1112. The first immersive environment 1104 can include a video image 1118 of the first user 1110 as captured by a camera 1116 in the second immersive environment 1112. The first user 1102 can interact with the video image 1118 of the second user 1110 in the first immersive environment 1104 by talking, making hand gestures, and otherwise communicating as the two users 1102, 1110 would communicate in real life.

In the second immersive environment 1112, the second user 1110 can interact with a CGI character 1108 that is based on the motion capture of the first user 1102. For example, the movements of the first user 1102 can drive an animated version of C-3PO. In order to capture a raw video image of the first user 1110, a dynamic green screen 1114 can be displayed on a portion of the display devices of the second immersive environment 1112. The video of the first user 1110 can be transmitted to and displayed in the first immersive environment. The first user 1110 can interact with the CGI character 1108 whose voice and actions are driven by the first user 1102.

Note that the arrangement of FIG. 11 is merely exemplary and not meant to be limiting. In other embodiments, both users 1102, 1110 may represent CGI characters and be the subjects of motion capture. In other embodiments, both users 1102, 1110 can use live video of themselves for display and interaction in the others' immersive environment. Additionally, some embodiments may use more than two immersive environments. For example, a group of friends could get together online, each having their own immersive environment, and link the immersive environments together in order to act out a scene from a movie, relive a sporting event, or play a videogame. Each individual immersive environment that is networked together over the Internet may support multiple users. For example, the first immersive environment 1104 can support the first user 1102 as well as an additional user (not shown) in a manner similar to that described above in relation to FIGS. 10A-10B using shutter glasses or dedicated portions of the display device for each user.

Figure 12:
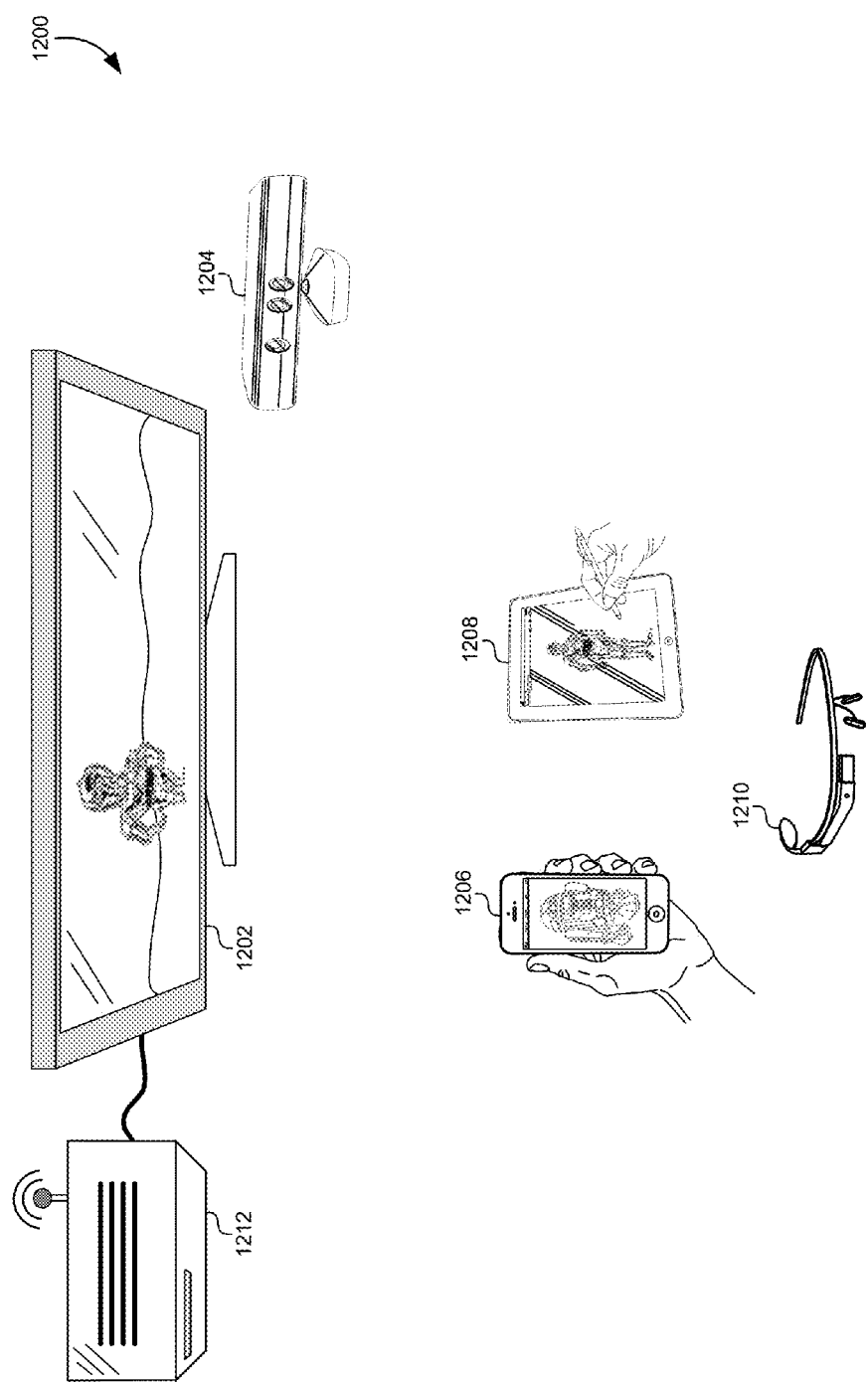
FIG. 12 illustrates additional elements of the immersive environment, according to some embodiments.

FIG. 12 illustrates additional elements of the immersive environment, according to some embodiments. In this embodiment, the immersive environment and the interactive content system can be integrated into a home entertainment system. A television 1202 and a content system 1212 can be programmed to implement the functions of the immersive environment and the interactive content system described herein. Although this environment may not be as truly "immersive" as the full-room environments described above, this environment does offer the convenience of the user's home.

In one aspect, the content system 1212 may establish a communicative link with one or more interactive devices (e.g., mobile phones 1206, tablets 1208, laptops, interactive eyewear 1210, such as Google Glass®, Oculus® virtual-reality headsets, etc.) in proximity to the content system 1212. For example, the content system 1212 may establish a bluetooth link with a mobile phone 1206 located within the local area. Following establishment of the communicative link, the content system 1212 may receive a selection of a particular item of content to present to the users of the one or more portable devices. The content may be, for example, a movie, a television show, a video game, etc. Upon receiving the selection, the system may retrieve information regarding the content and may cause the display of images of assets and/or environments associated with the content on the display devices. Each display device may be assigned to generate a particular portion of the assets and/or environments associated with the content. In these embodiments, the television 1202, the mobile phone 1206, the tablet 1208, and so forth, may be considered display devices in the immersive environment context.

In one aspect, a user may be watching a movie on the TV 1202. The content system 1212 can send a message to the mobile phone 1206 and/or the tablet 1208 with additional interactive content. For example, while watching Star Wars, the content system 1212 could transmit a game, a behind-the-scenes featurette, an interview, and/or the like to any of the mobile devices. In another aspect, a primary view of a rendering of a 3-D virtual scene may be displayed on the TV 1202, while the user is allowed to watch the same scene simultaneously rendered from different angles on the mobile phone 1202 and/or the tablet 1208. For example, while watching Star Wars, the content system 1212 could provide the normal linear movie video to the TV 1202 while simultaneously presenting the same scene rendered from a different perspective to one or more of the mobile devices. In another aspect, each of the display devices 1202, 1206, 1208 could provide information from multiple camera angles in a real-world recording. For example, a user could watch a concert or sporting event from a front perspective on the TV 1202, while watching a close-up of individual artists or athletes on the mobile devices 1206, 1208.

The use of mobile devices, such as the mobile phone 1206 and/or the tablet 1208 need not be limited to a home theater environment. In some embodiments, these mobile devices may be integrated into the more immersive environment described in the preceding sections. For example, turning back briefly to FIG. 3A, the user 304 can hold a tablet that includes additional rendered content from the 3-D virtual scene. The angle and location of the tablet would control the view of the additional rendered content. The angle and location of the tablet can be determined using gyroscopes and accelerometers internal to the mobile device. For example, the user 304 can hold up the tablet and view portions of R2-D2 with different lighting, different visual effects, different paint colors, and so forth. In this manner, a director could use a tablet or mobile phone as a real-time virtual viewfinder and quickly adjust the way that the scene is being rendered, lighted, or otherwise set up prior to shooting the scene.

Interactive Content System

Figure 13:
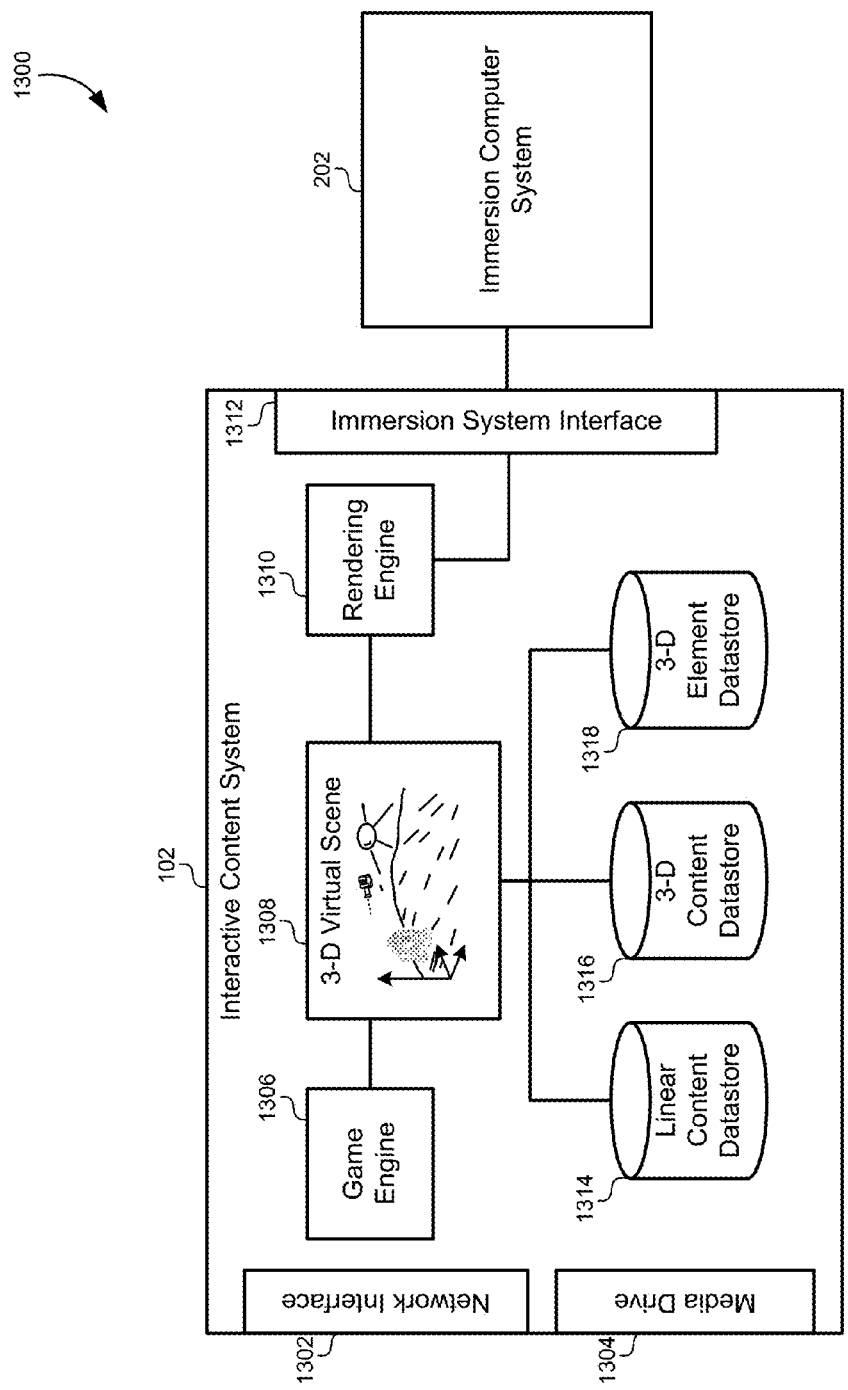
FIG. 13 illustrates a block diagram of an interactive content system, according to some embodiments.

The immersion system of FIG. 1 may be communicatively coupled to an interactive content system that is configured to generate interactive content in real time. FIG. 13 illustrates a block diagram 1300 of an interactive content system 102, according to some embodiments. The interactive content system may be implemented as a media player in a home entertainment environment, or as a computer server in an online environment. The interactive content system 102 may also be implemented as a custom computer system in some settings, as well as a general purpose computer system programmed to specifically perform the functions described herein. The interactive content system 102 may include an immersion system interface 1312 that communicates with the immersion computer system 202.

The separation of the immersion computer system 202 and the interactive content system 102 is but one possible architecture for implementing an interactive content and immersion system. In other embodiments, the interactive content system 102 and the immersion computer system 202 may be implemented on the same general purpose computing system or otherwise have their functions distributed between various modules and computing systems as needed. Furthermore, the specific modules depicted in FIG. 2 and FIG. 13 are merely exemplary. It will be understood that modules could be further subdivided into submodules, or modules may be combined together in any combination without limitation.

The interactive content system 102 may also include a network interface 1302 through which content can be downloaded from the server. In a home environment, content may be downloaded from the content server and played on a display device such as a television. The network interface may also include wireless interfaces, such as 802.11 Wi-Fi and Bluetooth for communicating with portable computing devices within the immediate proximity. For example, the interactive content system 102 may send content to and receive commands from a tablet computer, a mobile phone, a laptop computer, and/or the like. The network interface 1302 may also receive input from a user or from the tracking system described above.

The interactive content system 102 may also include a media drive 1304. In home entertainment embodiments, the media drive 1304 may include a CD-ROM drive, a DVD drive, a Blu-ray drive, or any other type of media drive used to store content. The media drive 1304 may be one method of delivering content to the interactive content system 102. For example, a user could insert a Blu-ray edition of a *Star Wars: Episode I* movie into the media drive 1304. The Blu-ray disc may include a serial (i.e. linear) version of the movie, as well as bonus content tailored for the interactive and immersive environment. In one embodiment, the Blu-ray disc may also include 3-D virtual scene information for at least some of the scenes in the Star Wars movie. For example, a battle scene may include a fight between CGI robots and CGI aliens. Virtual 3-D scene information may be stored on the disk along with the serial version of the movie. As the user watches the movie, they may be presented with an option to "enter the scene." By selecting this option, the user may be able to control how the 3-D virtual scene is rendered by controlling the camera view, watching the scene from the perspective of a character, interacting with the scene to cause different outcomes, replacing characters within the scene, placing the scene in different environments, and/or the like. All of these options may be available by simply providing the 3-D virtual scene information to the interactive content system 102. In some embodiments, the media drive 1304 may simply accept a serial version of the movie, and the additional 3-D virtual scene content can be downloaded through the network interface 1302 from a server.

In addition to reading content through a media drive 1304 and a network interface 1302, the interactive content system 102 may also store interactive content on internal storage devices. A linear content datastore 1314 may store serial versions of movies, games, television shows, and/or the like. The user may select any of these programs and fast-forward, rewind, pause, and play the programs at will. When the user decides to engage interactively with the program, 3-D virtual scene information can be stored in a 3-D content datastore 1316 instead of needing to be downloaded or read the virtual 3-D scene information from an external media device. Additionally, users may wish to replace characters in the scene with other characters available in a 3-D element datastore 1318. The 3-D element datastore 1318 may include character models, scenery, weapons, objects, different environments, and/or the like. By way of example, a user could cause the *Star Wars* movie and choose to replace Obi-Wan Kenobi with Jabba the Hutt. The user could also choose to change the scene from daytime to nighttime, and to move the scene from Tatooine to a different planet.

The interactive content system 102 can load a 3-D virtual scene 1308 from the 3-D content datastore 1316 and extract additional information from the 3-D element datastore 1318 to construct a new scene according to the inputs of the user. When the user is satisfied with the reconstructed 3-D virtual scene 1308, it can be passed to a rendering engine 1310 and rendered for display in the immersive environment.

Although the above description has focused on additional content when playing a movie, the interactive content system 102 can also provide real-time scene rendering when a user decides to enter a scene in an immersive environment as described above. In this case, the 3-D virtual scene 1308 can be rendered in real-time from the perspective of the user in the immersive environment. Rendering engine 1306 may also operate in conjunction with the interactive content system 102 such that user inputs can be processed and the game engine 1306 can make changes to the 3-D virtual scene 1308 in response in real time. For example, a user may interact with a character in the 3-D virtual scene 1308. In response, the game engine 1306 can alter the behavior of the character and the resulting changes can be fed into the 3-D virtual scene 1308 to drive the animation of the character. The resulting 3-D virtual scene 1308 can then be rendered by the rendering engine 1310 in real time and presented to the user on the display devices of the immersive environment. In other embodiments, the game engine 1306 can be used to actually provide a gaming environment for the user. For example, a battle scene in the *Star Wars* movie may include an option for a user to enter a space battle game environment based on the scene. The user could then play the game, for example on a tablet computer, using the game engine 1306. The game could also be played in a more interactive and immersive environment by rendering the 3-D virtual scene and providing images for the display devices of the immersive environment such that the user could play the game using real-life interactions with the content.

By combining interactive content system 102 with the immersion computer system 202, many different ways of interacting with content become available to a user. The following include some broad examples of content interaction that may be facilitated by such a system.

In one embodiment the interactive content system 102 may include one or more computing devices (e.g., server computers) configured to communicate and/or control one or more interactive devices (e.g., mobile phones, tablet devices, televisions, digital video recording devices, set top devices, computing devices, display devices, etc). In one aspect, the interactive content system 102 may receive a request to load an item of interactive serial content, such as a movie or television show onto an interactive device. Upon receiving the request, the system may provide the content to a user by sending rendered images of the content to the interactive device, which presents the images to the user. Alternatively, the system may provide information usable by the interactive device to render the images of the content itself. Upon being presented with the images of the serial content, the user may pause, rewind, or fast forward to different portions of the item of serial content. Upon reaching a desired portion of the item of serial content, the user may select an asset (e.g., a character) currently being displayed by the item of content, and make modifications to the manner in which the serial content is presented. For example, a scene of a particular movie may present a robot from an overhead perspective. A user may interact with his/her interactive device to select the robot. Responsive to the selection, the system may render and present the remaining images of the movie or a particular scene of the movie from a first person viewpoint of the robot. As yet another example, a scene of a particular movie may present, in the foreground, a scene where a first protagonist escapes a prison. In the background, a starship battle may be occurring. The user may pause the movie using the interactive device, and select a starship from the battle occurring in the background. The system may then present an "in movie" game that enables the user to control the selected starship and battle other starships. After completion of the game (or at the user's discretion), the game may be exited and the starship battle returned to the background. The viewpoint of the protagonist may be returned to the foreground, and the serial movie may continue. In some instances, the outcome of an in movie game may influence a movie.

In another aspect, while presentation of an item of content occurs, a user may physically change the direction or orientation of his or her interactive device. Based on gryoscope information, GPS information, WiFi information, accelerometer information, and/or any other information from the interactive device, the system may change a perspective of the content. For example, a scene of a movie may display a straight ahead camera perspective. A user may rotate his or her tablet to the left. As a result, the system may present a perspective showing the left side of an environment of the scene. While the user rotates the tablet, the movie may continue to be presented serially. In such instances, the sound occuring in the movie may also be adjusted. For example, an explosion may occur in front of a camera perspective. As the user rotates his or her tablet to the left, the sound of the explosion may be shifted such that the user perceives that the explosion is to his or her right side.

In yet another aspect, a user may use a camera or other sensing device to generate a virtual representative of a real-world object. For example, the user may use a camera of the interactive device to take shots of a real-world object from multiple angles. The shots may be sent to the system, which generates a virtual representative of the object. The virtual representative may then be inserted into the item of content by the system. Thereafter, the user may interact with the vitival representative of the real-world object in the images presented by the item of content.

In yet another aspect, the interactive serial content may be tailored based on personalization information received from the interactive devices. For example, the interactive device may indicate that its user has an affinity for a particular comic book character, such as the Incredible Hulk. As a result, the system may load an asset representative of the Incredible Hulk that replaces Prince Charming in the *Cinderella* movie. In doing so, the movie may be presented to the user with the Incredible Hulk as the prince of the *Cinderella* movie. In another aspect, a user may provide personalization information using a user interface on the interactive device. Such information may then be sent to the system. In one aspect, the personalized serial content for the user may be distributed to one or more other authorized users selected by the user. The other authorized users may be selected from from a user profile associated with the user over a social network.

Figure 14A:
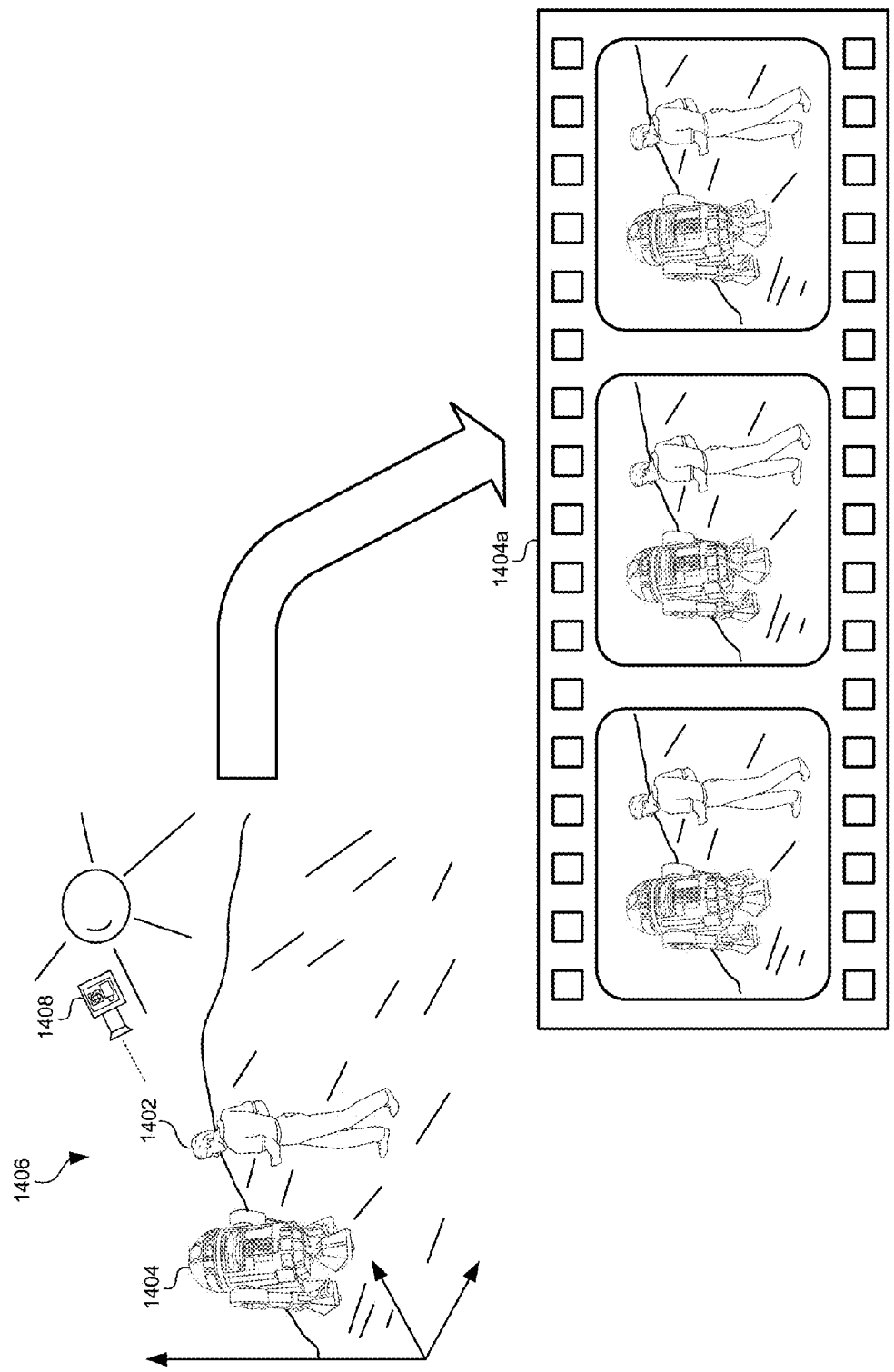
FIG. 14A illustrates one example of how content can be manipulated in real time, according to some embodiments.

FIG. 14A illustrates one example of how content can be manipulated in real time, according to some embodiments. The interactive content system may load a 3-D virtual scene 1406 that is associated with the movie scene selected by a user. The user may choose to view the scene from an alternate perspective by moving the camera 1408 to a position that is different from the position from which the scene was originally rendered in the actual movie. The position of the virtual camera 1408 may include an alternate view of a character 1402 and a CGI robot 1404. As the scene plays out, the rendering engine of the interactive content system can generate a sequence of 2-D images 1404a to be displayed in the immersive environment. The sequence of 2-D images 1404a may be skewed and otherwise formatted to be projected on the display devices of the immersive environment as described above. Alternatively, the 2-D images 1404a may be played simultaneously with the original scene on an alternate display device, such as a tablet computer. The angle, orientation, and position of the tablet computer in relation to the main display device (e.g. a wall screen or television screen) may be used to position, angle, and orient the virtual camera 1408 to generate the new render of the 3-D virtual scene.

Figure 14B:
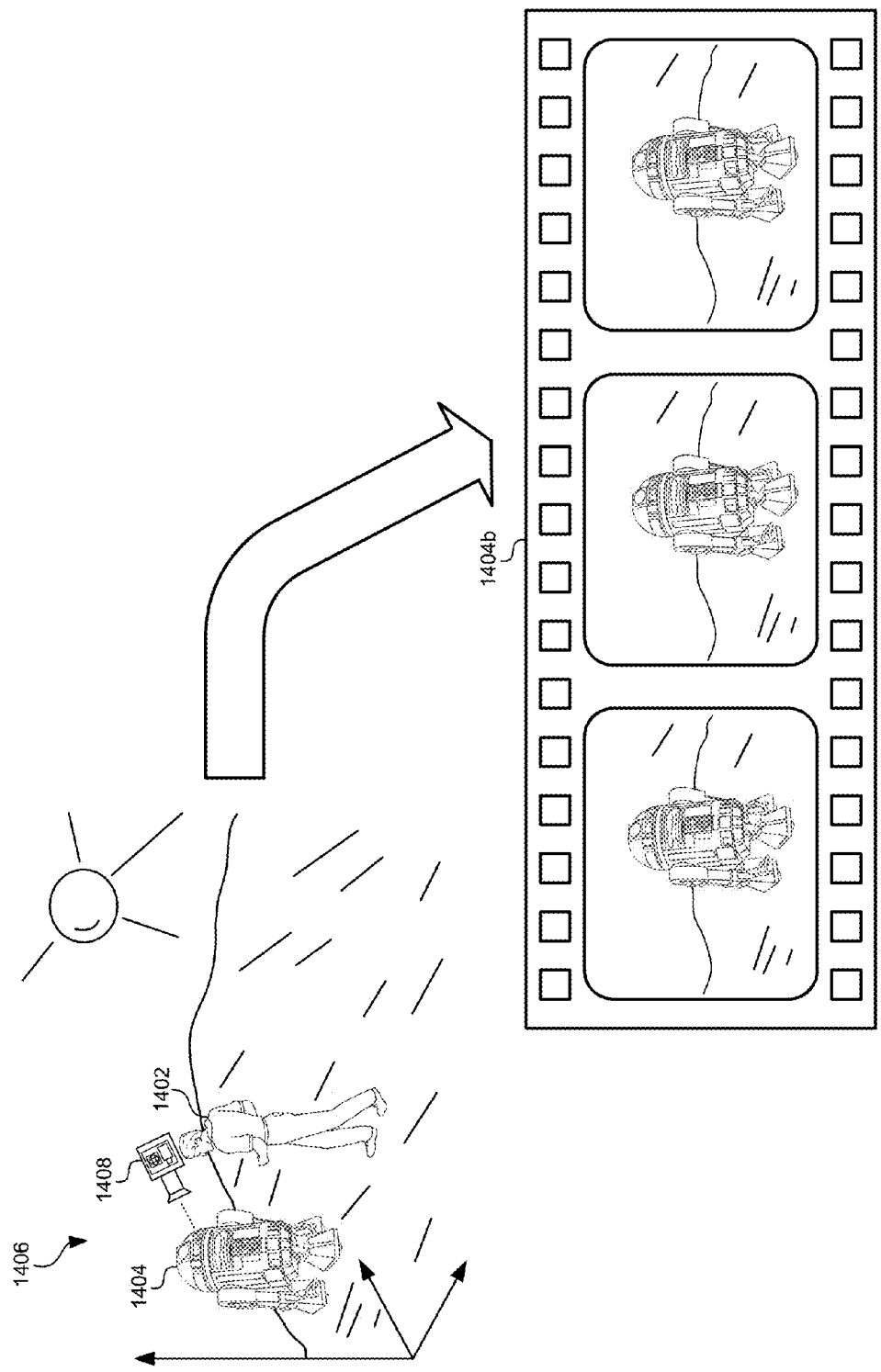
FIG. 14B illustrates a second example of how content can be manipulated in real time, according to some embodiments.

FIG. 14B illustrates a second example of how content can be manipulated in real time, according to some embodiments. In one aspect, a director or other person associated with developing content may use the immersive experience to identify or determine camera locations or movement for a film or television show. In particular, the director or other person can "enter" the immersive scene and determine the angle or direction of a camera by viewing the immersive scene from different angles and/or directions. The angle and direction determinations may be used to control the virtual camera 1408 that films the same 3D scene in order to generate a 2D film or television show. Similarly, an actor can use the immersive experience to aid in his or her acting performance (e.g., maintain eye level with a digital character). As another example, the immersive experience may be used by a movie viewer to be immersed within a customized movie based on the movie viewer's personal preferences. Illustratively, the user may prefer that a particular movie occur within a beach environment as opposed to a mountainous environment. As yet another example, a video game user may control a 3D holographic character within an immersive environment and interact with other assets in the immersive environment.

In the specific example of FIG. 14B, the user may choose to enter the scene from the perspective of a particular character 1402. Alternatively, a director may choose to view the scene from the perspective of the particular character 1402. The position of the virtual camera 1408 may be repositioned and oriented in the direction of the gaze of the particular character 1402. The sequence of 2-D images 1404b will include rendered images from the perspective of the particular character 1402. In the immersive environment, these images could be skewed and formatted for projection onto the display devices for the user or the director. In the immersive environment in the home entertainment scenario, the 2-D images 1404b can be displayed on one display device, such as a tablet computer, while the normally rendered scene is displayed on another display device, such as a projected screen or television.

FIG. 14C illustrates another example of how content can be manipulated in real time, according to some embodiments. Here, the content may be tailored based on personalization information received from a user's interactive device. For example, the interactive device may indicate that its user has an affinity for a particular comic book character, such as the Incredible Hulk. As a result, the system may load an asset representative of the Incredible Hulk that replaces Prince Charming in the *Cinderella* movie. In doing so, the movie may be presented to the user with the Incredible Hulk as the prince of the *Cinderella* movie. In another aspect, a user may provide personalization information using a user interface of the interactive device. Such information may then be sent to the interactive content system. In one embodiment, as images of an item of content are being presented, the system may adjust the images based on the location/movement of the interactive device. For example, if the interactive device (by virtue of the movement of its user) faces or moves towards a certain direction (as indicated by GPS/acceleration/gyroscope information from the interactive device), an environment of a scene of the item of content may change accordingly.

In the particular example of FIG. 14C, the user may choose to both relocate the position of the virtual camera 1408 and replace a character in the 3-D virtual scene 1406 with another character from a character library. For example, the human character 1402 of FIGS. 14A-14B may be replaced with a robot character 1410 from a 3-D element datastore as described in relation to FIG. 13. An animation model of the robot character 1410 may be retrieved from such a datastore or downloaded over a network. The position of the virtual camera 1408 may be rotated from the right side to the left side of the 3-D virtual scene 1406. The new perspective of the 3-D virtual scene 1406 along with the replacement character (the robot character 1410) may then be rendered into a sequence of 2-D images 1404c for display on the display devices of the immersive environment.

When rendering the 3-D virtual scene from the perspective of a user, the size of the user may determine the placement of the virtual camera. In addition to knowing the location of the user and the direction of the user's gaze, it may be advantageous to know the height of the user. An interactive device (e.g. a mobile phone or tablet computer) may provide height information for the user to the interactive content system. Alternatively or additionally, the height information may be stored in a user profile in the system. Based on the height information, the height of assets displayed by the system may be adjusted. For example, if a particular user were 6'7", the system may adjust a particular character in video game content to also be 6'7". In another example, the position of the virtual camera may be moved up to a height of 6'7" when rendering the 3-D virtual scene from the perspective of the user.

Figure 15:
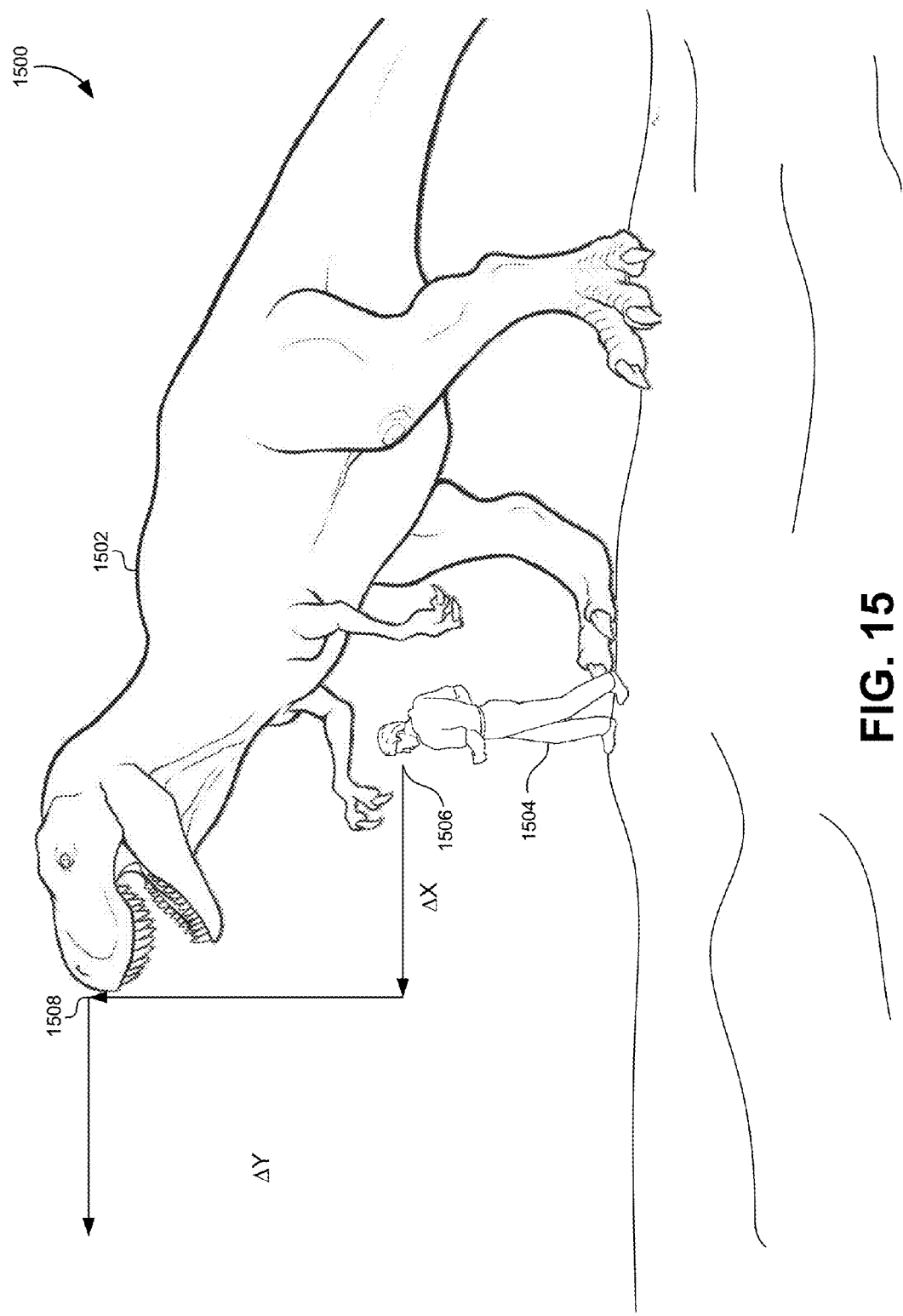
FIG. 15 illustrates an example of perspective translation for character replacement, according to some embodiments.

FIG. 15 illustrates an example of perspective translation for character replacement, according to some embodiments. In this example, a user 1504 is inserted into a 3-D virtual scene 1500. However, the user may choose to experience the scene not from his own perspective, but from the perspective of another character. In FIG. 15, the user 1504 may choose to experience a scene from the perspective of a large dinosaur 1502. The viewpoint 1508 of the dinosaur 1502 may be the tip of its nose, whereas the viewpoint 1506 of the user 1504 may be the tip of his/her nose. In order to experience the scene from the perspective of the dinosaur 1502, the movement and position of the user 1504 can be translated to the viewpoint of the dinosaur 1508. This translation may involve X-, Y-, and Z-coordinate translation, scaling and/or rotation. For example, as the dinosaur rotates around its center, the viewpoint 1508 of the dinosaur will rotate in a large circle. In contrast, when the user 1504 rotates around his/her center, the viewpoint 1506 of the user will rotate in a very small circle. The center of rotation as well as the $\Delta X$, $\Delta Y$, $\Delta Z$ difference between the viewpoints 1506, 1508 can be used to reposition the viewpoint of the user 1506 in real-time as he/she moves through the 3-D virtual scene.

Figure 16:
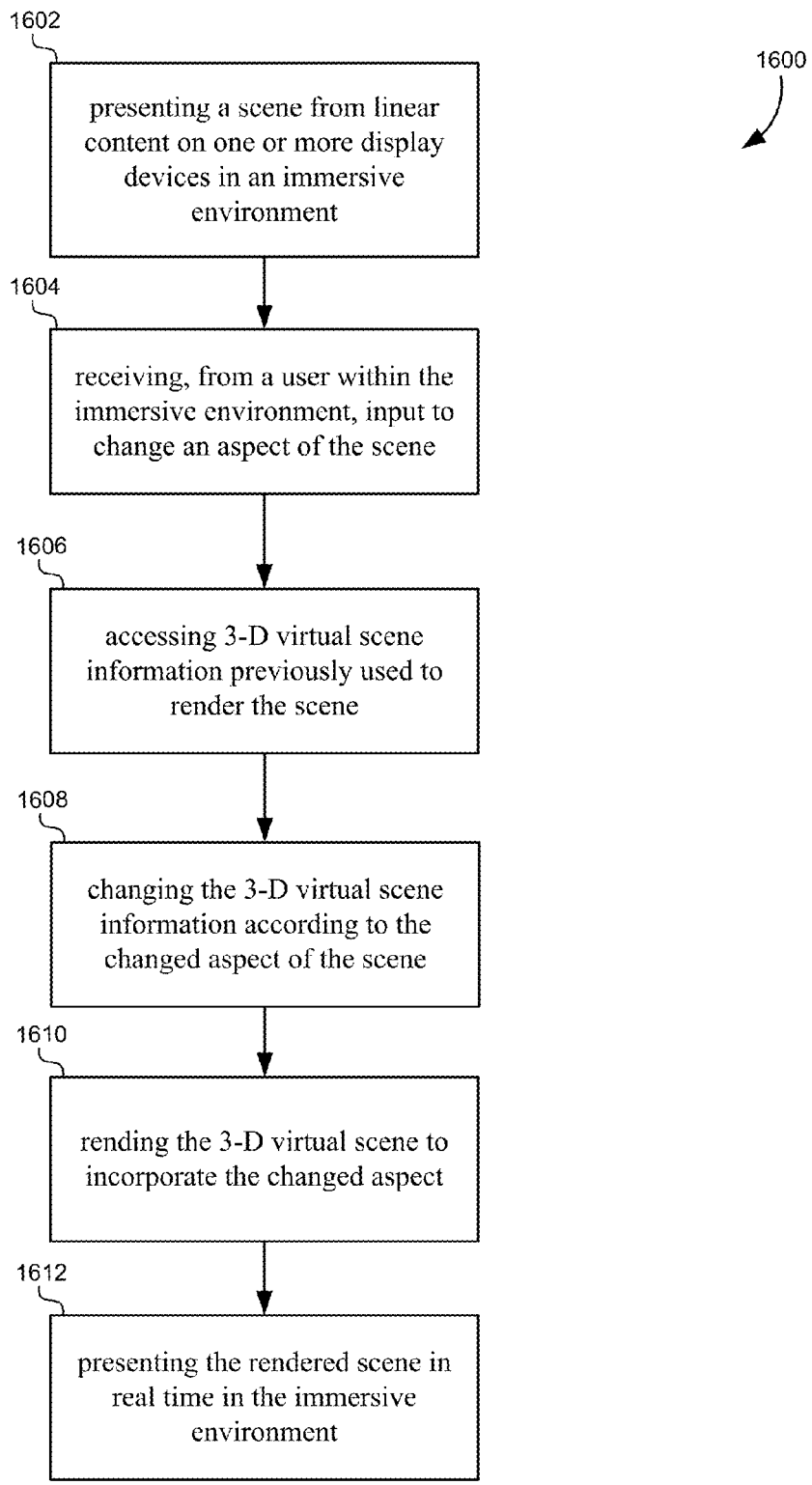
FIG. 16 illustrates a flowchart of a method for providing an interactive user experience in an immersive environment, according to some embodiments.

FIG. 16 illustrates a flowchart 1600 of a method for providing an interactive user experience in an immersive environment, according to some embodiments. It will be understood that the method of flowchart 1600 is but one example of a method using the systems and algorithms described above. Other features described in detail elsewhere in this disclosure may be added to flowchart 1600 without limitation. The method may include presenting a scene from linear content on one or more display devices in an immersive environment (1602). The immersive environment may include a panoramic display of active screens or projection screens that surround a user, and may include projections that extend on multiple walls, floors, ceilings, and so forth. The linear content may include a previously rendered motion picture. For example, the user may be watching a scene from the movie Star Wars: Episode I. The scene may include CGI elements and characters that were part of a rendered 3-D virtual scene. The linear content may be the original version of the scene as available in movie theaters.

The method may also include receiving, from a user within the immersive environment, input to change an aspect of the scene (1604). The input may include providing a digital input on a remote control or other computer input device that changes the aspect in the scene. The aspect of the scene may include a perspective from which the scene is rendered, or the actions or dialogue of a CGI character or object. For example, a user may talk to one of the CGI characters presented on the one or more display devices. The user may interact with a CGI character through motions, such as throwing an object to the character or pointing at a scene element. The user may move relative to the display of the CGI character. The user may provide an input that instructs the system to render the current scene from a different perspective. For example, the user may choose to have a scene from Star Wars rendered from the perspective of C-3PO.

The method may additionally include accessing 3-D virtual scene information previously used to render the scene (1606). For example, the Star Wars: Episode I movie may be distributed or downloaded onto digital media, and the 3-D virtual scene information may accompany the linear content. In this example, the 3-D virtual scene elements, such as character rigs, environmental elements and objects, camera angles and positions, textures, lighting effects, dialogue, and so forth, may be available for certain scenes in the Star Wars movie. When the input is received from the user, the system can access the 3-D virtual scene information at a time corresponding to the real-time display of the linear content being viewed by the user.

The method may also include changing the 3-D virtual scene information according to the changed aspect of the scene (1608). Continuing with the Star Wars example, the position and orientation of the virtual camera used to render the scene can be changed to correspond to the location and view direction of a character such as C-3PO. If the user interacts with one of the characters, a game engine may be used to generate responses by the CGI characters in the scene. For example, a physics engine may be used to simulate a character response to being hit by an object thrown by the user in the immersive environment. In another example, a CGI character, such as R2-D2, could move in the 3-D virtual scene relative to the user. This may allow the virtual 3-D scene to play out an alternate scene that is reactive to user inputs and that may differ from the original scene per trade by the linear content.

The method may further include rendering the 3-D virtual scene to incorporate the changed aspect (1610). As the scene changes are made as described above in relation to step 1608, the 3-D virtual scene can be rendered in real time, or at interactive frame rates, such that the immersive environment can display character reactions and changed scene elements without an appreciable delay that is noticeable by the user. The method may additionally include presenting the rendered scene in real time in the immersive environment (1612).

It should be appreciated that the specific steps illustrated in FIG. 16 provide particular methods of providing an interactive user experience in an immersive environment according to various embodiments of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
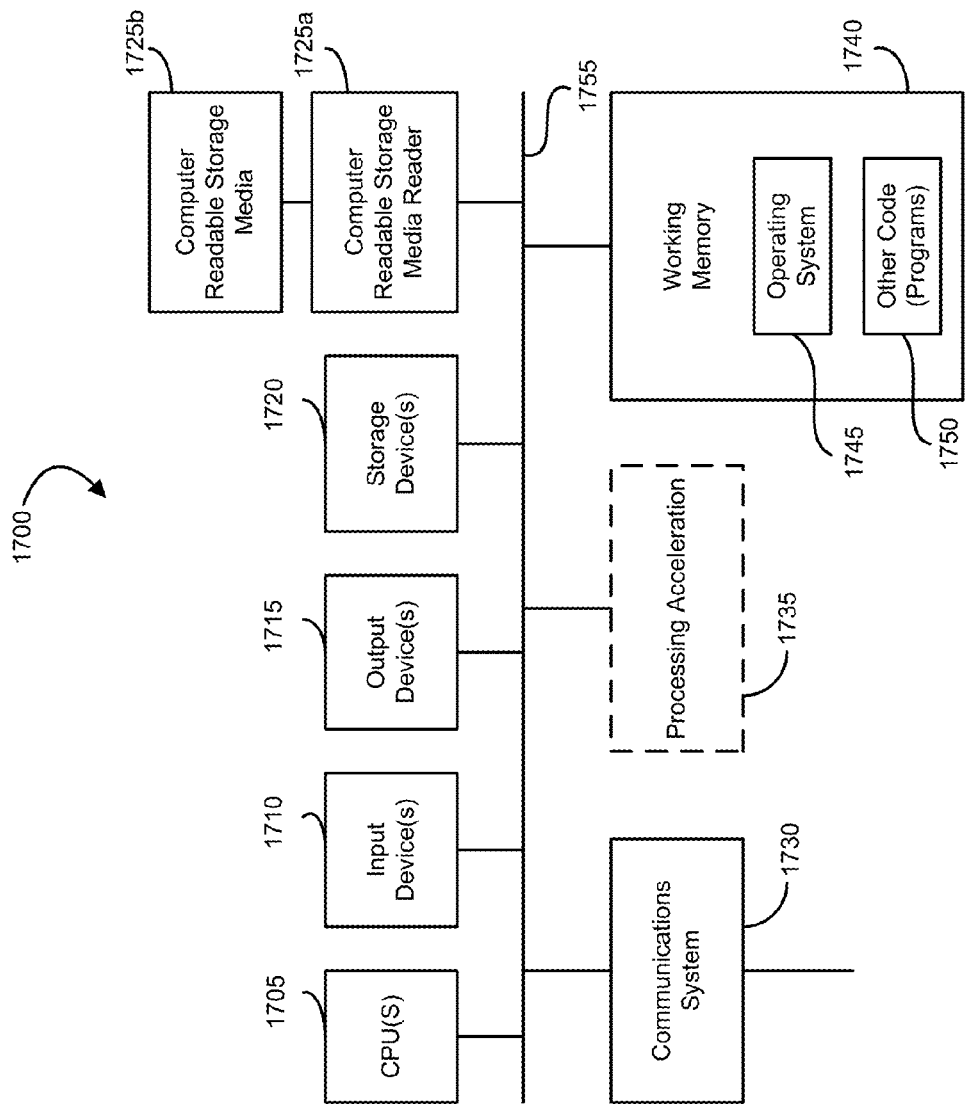
FIG. 17 illustrates a block diagram of an exemplary computer system in which embodiments of the present invention may be implemented.

Each of the embodiments disclosed herein may be implemented in a special-purpose computer system. FIG. 17 illustrates an exemplary computer system 1700, in which parts of various embodiments of the present invention may be implemented. The system 1700 may be used to implement any of the computer systems described above. The computer system 1700 is shown comprising hardware elements that may be electrically coupled via a bus 1755. The hardware elements may include one or more central processing units (CPUs) 1705, one or more input devices 1710 (e.g., a mouse, a keyboard, etc.), and one or more output devices 1715 (e.g., a display device, a printer, etc.). The computer system 1700 may also include one or more storage device 1720. By way of example, storage device(s) 1720 may be disk drives, optical storage devices, solid-state storage device such as a random access memory ("RAM") and/or a read-only memory ("ROM"), which can be programmable, flash-updateable and/or the like.

The computer system 1700 may additionally include a computer-readable storage media reader 1725a, a communications system 1730 (e.g., a modem, a network card (wireless or wired), an infra-red communication device, etc.), and working memory 1740, which may include RAM and ROM devices as described above. In some embodiments, the computer system 1700 may also include a processing acceleration unit 1735, which can include a DSP, a special-purpose processor and/or the like.

The computer-readable storage media reader 1725a can further be connected to a computer-readable storage medium 1725b, together (and, optionally, in combination with storage device(s) 1720) comprehensively representing remote, local, fixed, and/or removable storage devices plus storage media for temporarily and/or more permanently containing computer-readable information. The communications system 1730 may permit data to be exchanged with the network 1720 and/or any other computer described above with respect to the system 1700.

The computer system 1700 may also comprise software elements, shown as being currently located within a working memory 1740, including an operating system 1745 and/or other code 1750, such as an application program (which may be a client application, web browser, mid-tier application, RDBMS, etc.). It should be appreciated that alternate embodiments of a computer system 1700 may have numerous variations from that described above. For example, customized hardware might also be used and/or particular elements might be implemented in hardware, software (including portable software, such as applets), or both. Further, connection to other computing devices such as network input/output devices may be employed. Software of computer system 1700 may include code 1750 for implementing embodiments of the present invention as described herein.

Each of the methods described herein may be implemented by a computer system, such as computer system 1700 in FIG. 17. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory computer-readable medium" includes, but is not limited to, portable or fixed storage devices, optical storage devices, and various other non-transitory mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
   storing 3-D virtual scene information and linear content, wherein the linear content was previously rendered from the 3-D virtual scene information;
   presenting a scene from the linear content on one or more display devices in an immersive environment;
   receiving, from a user within the immersive environment, input to change an aspect of the scene;
   accessing the 3-D virtual scene information previously used to render the scene;
   changing the 3-D virtual scene information according to the changed aspect of the scene;
   rendering the 3-D virtual scene to incorporate the changed aspect; and
   presenting the rendered scene in real time in the immersive environment.

2. The method of claim 1, wherein the immersive environment comprises a panoramic display of the scene, and wherein the one or more display devices comprise a display on a floor of the immersive environment.

3. The method of claim 1, wherein the linear content comprises a previously released motion picture.

4. The method of claim 1, wherein the input to change the aspect of the scene comprises a user interaction with the aspect of the scene displayed on the one or more display devices in real time.

5. The method of claim 1, wherein the aspect of the scene comprises a behavior or dialogue of a CGI character.

6. The method of claim 1, wherein the aspect of the scene comprises a perspective from which the scene was rendered.

7. The method of claim 1, further comprising:
tracking motion of a second user; and
using the motion of the second user to drive a CGI character in the 3-D virtual scene.

8. A system comprising:
one or more display devices forming an immersive environment;
one or more processors; and
one or more memory devices comprising instructions that, when executed by the one or more processors, cause the one or more processors to perform operations comprising:
storing 3-D virtual scene information and linear content, wherein the linear content was previously rendered from the 3-D virtual scene information;
presenting a scene from the linear content on one or more display devices in an immersive environment;
receiving, from a user within the immersive environment, input to change an aspect of the scene;
accessing the 3-D virtual scene information previously used to render the scene;
changing the 3-D virtual scene information according to the changed aspect of the scene;
rendering the 3-D virtual scene to incorporate the changed aspect; and
presenting the rendered scene in real time in the immersive environment.

9. The system of claim 8, wherein the immersive environment comprises a panoramic display of the scene, and wherein the one or more display devices comprise a display on a floor of the immersive environment.

10. The system of claim 8, wherein the linear content comprises a previously released motion picture.

11. The system of claim 8, wherein the input to change the aspect of the scene comprises a user interaction with the aspect of the scene displayed on the one or more display devices in real time.

12. The system of claim 8, wherein the aspect of the scene comprises a behavior or dialogue of a CGI character.

13. The system of claim 8, wherein the aspect of the scene comprises a perspective from which the scene was rendered.

14. The system of claim 8, wherein the one or more memory devices further comprise instruction that, when executed by the one or more processors, cause the one or more processors to perform operations further comprising:
tracking motion of a second user; and
using the motion of the second user to drive a CGI character in the 3-D virtual scene.

15. A non-transitory computer-readable medium comprising instructions that, when executed by one or more processors, cause the one or more processors to perform operations comprising:
storing 3-D virtual scene information and linear content, wherein the linear content was previously rendered from the 3-D virtual scene information;
presenting a scene from the linear content on one or more display devices in an immersive environment;
receiving, from a user within the immersive environment, input to change an aspect of the scene;
accessing the 3-D virtual scene information previously used to render the scene;
changing the 3-D virtual scene information according to the changed aspect of the scene;
rendering the 3-D virtual scene to incorporate the changed aspect; and
presenting the rendered scene in real time in the immersive environment.

16. The non-transitory computer-readable medium of claim 15, wherein the immersive environment comprises a panoramic display of the scene, and wherein the one or more display devices comprise a display on a floor of the immersive environment.

17. The non-transitory computer-readable medium of claim 15, wherein the linear content comprises a previously released motion picture.

18. The non-transitory computer-readable medium of claim 15, wherein the input to change the aspect of the scene comprises a user interaction with the aspect of the scene displayed on the one or more display devices in real time.

19. The non-transitory computer-readable medium of claim 15, wherein the aspect of the scene comprises a behavior or dialogue of a CGI character.

20. The non-transitory computer-readable medium of claim 15, wherein the aspect of the scene comprises a perspective from which the scene was rendered.

* * * * *